United States Patent [19]
Ueda et al.

[11] Patent Number: 6,064,828
[45] Date of Patent: *May 16, 2000

[54] CAMERA DETECTING THE TYPE OF LOADED FILM AND ADJUSTING AMPLIFIER GAIN OF MAGNETIC READ CIRCUIT

[75] Inventors: Toshiharu Ueda, Yokohama; Chikara Aoshima, Zama, both of Japan

[73] Assignee: Canon Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/354,058

[22] Filed: Dec. 6, 1994

Related U.S. Application Data

[63] Continuation of application No. 07/867,316, Apr. 10, 1992, abandoned.

[30] Foreign Application Priority Data

| Apr. 12, 1991 | [JP] | Japan | ................................. 3-106365 |
| Jul. 9, 1991 | [JP] | Japan | ................................. 3-193671 |
| Jul. 31, 1991 | [JP] | Japan | ................................. 3-213210 |
| Oct. 9, 1991 | [JP] | Japan | ................................. 3-289366 |

[51] Int. Cl.⁷ .............................. G03B 7/24; G03B 17/24
[52] U.S. Cl. ............................................ 396/207; 396/319
[58] Field of Search ................................. 354/21, 75, 76, 354/105, 106; 360/1, 3, 32, 46, 67, 68, 90; 396/207, 208, 210, 319

[56] References Cited

U.S. PATENT DOCUMENTS

| 4,326,224 | 4/1982 | Kogure et al. ........................ 360/68 X |
| 4,422,109 | 12/1983 | Sampei et al. ............................ 360/65 |
| 4,864,332 | 9/1989 | Harvey ..................................... 354/21 |
| 5,025,274 | 6/1991 | Pagano ..................................... 354/21 |
| 5,032,854 | 7/1991 | Smart et al. .............................. 354/21 |
| 5,126,777 | 6/1992 | Akashi et al. ............................ 396/99 |
| 5,142,310 | 8/1992 | Taniguchi et al. ...................... 354/106 |
| 5,172,280 | 12/1992 | Quintus et al. ........................ 360/46 X |

FOREIGN PATENT DOCUMENTS 55-22799   2/1980   Japan .

Primary Examiner—Howard B. Blankenship
Attorney, Agent, or Firm—Fitzpatrick, Cella, Harper & Scinto

[57] ABSTRACT

A camera having curcuitry for detecting the type of loaded film has a processor for reading information from a recording portion of the loaded film. Detection circuitry is provided for detecting the type of film loaded in the camera, and an adjustment circuit is provided for adjusting a signal level of the information read by the processor. The adjustment circuit changes an adjustment characteristic on the basis of the film type detected by the detection circuit.

5 Claims, 31 Drawing Sheets

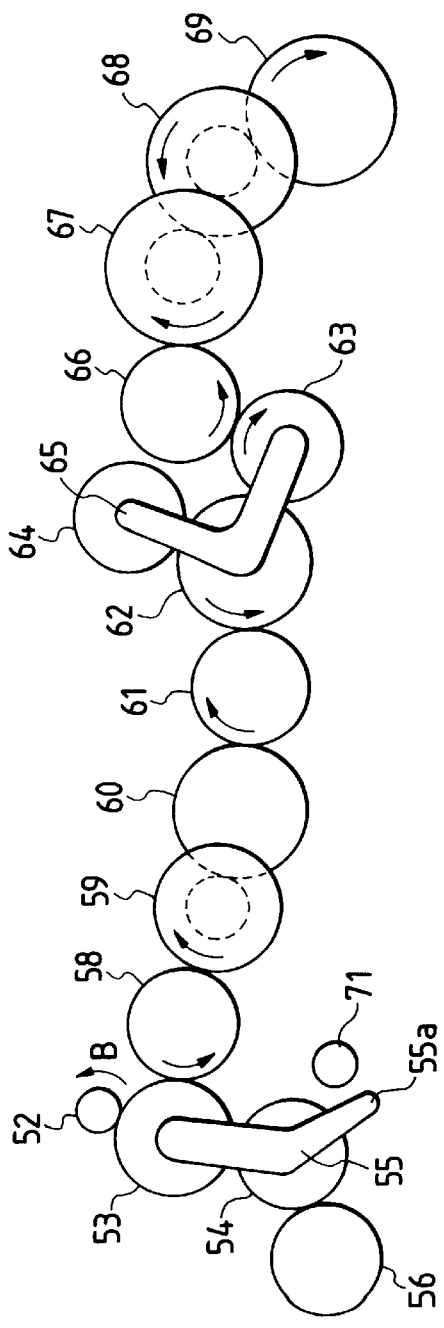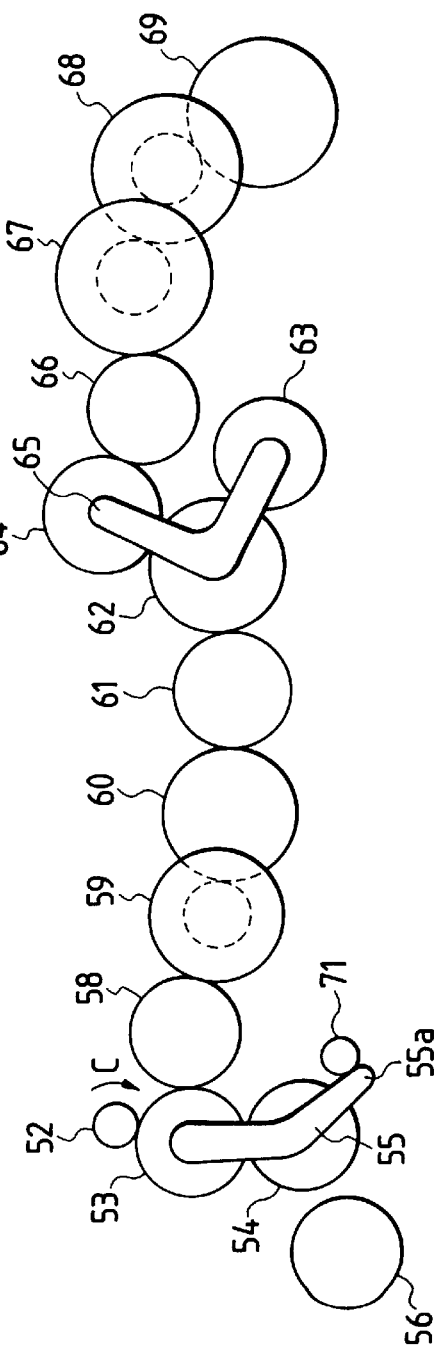

CAMERA DETECTING THE TYPE OF LOADED FILM AND ADJUSTING AMPLIFIER GAIN OF MAGNETIC READ CIRCUIT

This application is a continuation of application Ser. No. 07/867,316 filed Apr. 10, 1992, now abandoned.

BACKGROUND OF THE INVENTION

1. Field of the Invention

The present invention relates to a camera having a magnetic head and a magnetic recording/reproducing circuit and which uses a film having a magnetic recording portion.

2. Related Background Art

U.S. Pat. No. 4,864,332 discloses a magnetic recording portion in a film which is used to record and reproduce the film information and the photographing information of a camera. Also, a camera has been proposed in Japanese Laid-Open Patent Application No. 55-22799 in which the film information is magnetically recorded onto a member moving integrally with a film, and the information is read while feeding the film.

However, the density of a magnetic layer on the magnetic recording portion of the film is different depending on the type of the film.

Particularly, as to the difference between a negative film and a reversal film, the reversal film is required to have more transparency and thus a much lower density of the magnetic layer than in the negative film.

Thereby, there is a drawback that when a reproducing apparatus for the magnetic recording data has set a data recognition level corresponding to the reproduction of the negative film, an information reading error may occur because the reproduction level of the magnetic information is lower for the reversal film.

Also, if the reproduction is made at a high gain fixed in order to cope with the reversal film, there is a possibility that the reproducing signal of the negative film having a high reproduction level may be saturated so that the recognition is differently made from the recorded data.

SUMMARY OF THE INVENTION

One aspect of the present invention is to provide a camera which can read the information from the film in a reliable manner by eliminating the level difference in the reproducing signal for the magnetic recording data which may arise depending on the type of a film.

Another aspect of the present invention is to provide a camera comprising means for determining the type of film and which changes the gain of a magnetic recording/reproducing circuit in accordance with a determination result by the means for determining the film type.

A further aspect of the present invention is to provide a camera which changes the A/D conversion level of a magnetic recording/reproducing circuit in accordance with the type of a film.

Yet another aspect of the present invention is to provide a camera which changes the turn number of a coil for a magnetic recording head in accordance with the type of film.

Still another aspect of the present invention is to provide a camera which changes the feed rate in accordance with the type of a film.

Other objects of the present invention will become clear from the following description of examples taken in conjunction with the drawings.

BRIEF DESCRIPTION OF THE DRAWINGS

FIG. 31 is a plan view illustrating an arrangement of the gear train in winding the film with the film feed mechanism of FIG. 30.

FIG. 32 is a plan view illustrating an arrangement of the gear train in rewinding the film with the film feed mechanism of FIG. 30.

DESCRIPTION OF THE PREFERRED EMBODIMENTS

Figure 1:
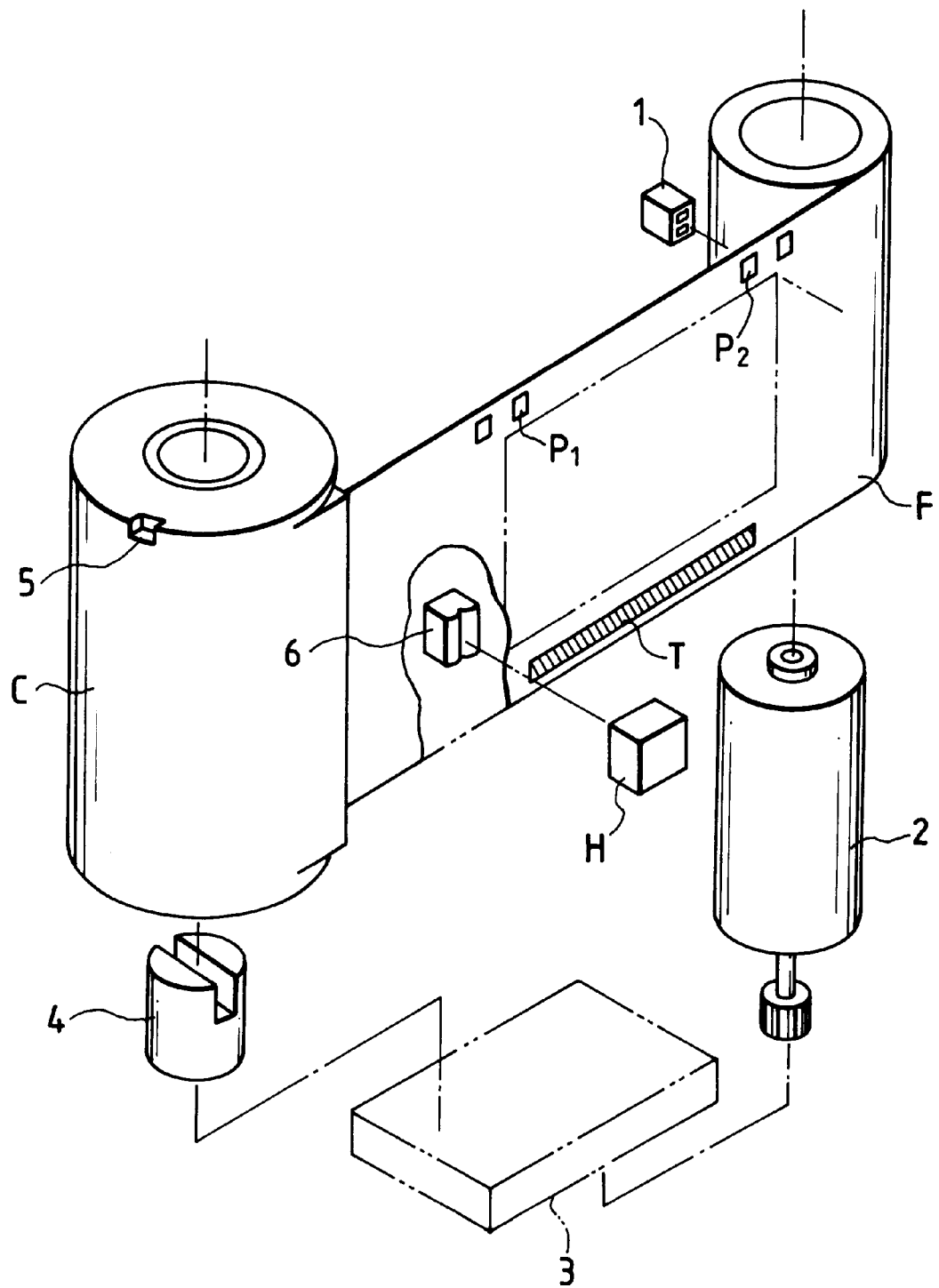
FIG. 1 is a perspective view illustrating a schematic internal constitution of a camera in a first example.
Figure 2:
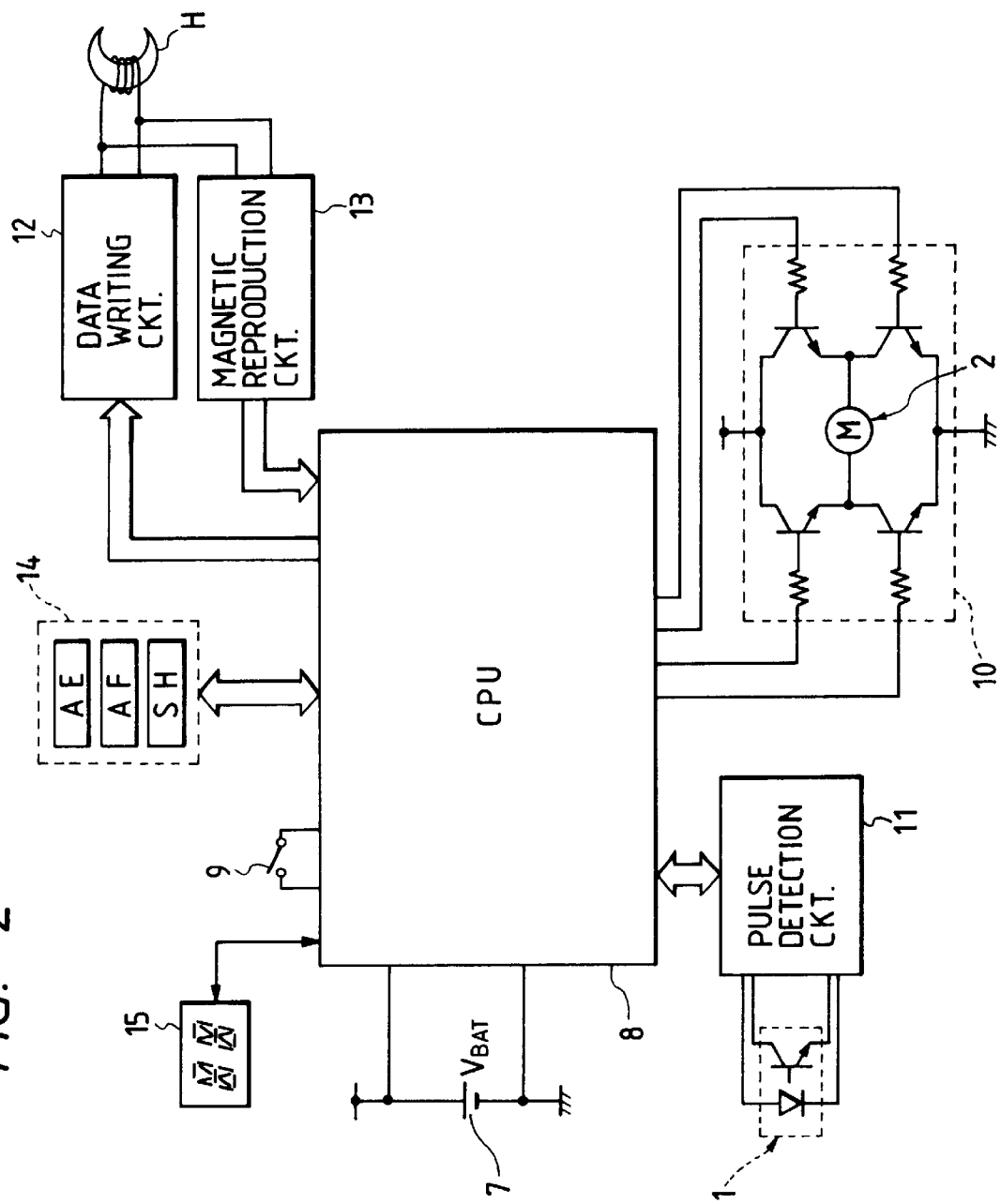
FIG. 2 is a block diagram of a whole circuit of the camera in this example.

FIGS. 1 to 4 are views illustrating an example of the present invention, wherein FIG. 1 is a perspective view illustrating a schematic internal constitution of a camera in this example, and FIG. 2 is a block diagram of a whole circuit of the camera in this example.

In FIG. 1 and FIG. 2, 1 is a feeding photo reflector for detecting perforations P1, P2 of a film F to feed the film a predetermined distance, 2 is a film feeding motor disposed within a spool, 3 is a gear train for making a changeover between the speed reduction and, the winding or the rewinding, 4 is a rewind fork, C is a film cartridge, F is a film having a magnetic layer applied on the base side, 5 is a film type determination portion for determining whether the film F is a negative or reversal in terms of a cutout position, T is a track on which the data such as the exposure conditions or the frame number are recorded as the magnetic information, P1, P2 are perforations corresponding to a picture plane, H is a magnetic head for writing or reading the information into or from the track T on the film, 6 is a pressing pad for pressing the film F onto the magnetic head, 7 is a battery for driving the whole system, 8 is a microcomputer for controlling the driving of the whole system, 9 is a release switch for starting the photographing operation, 10 is a feed circuit for winding and rewinding the film, 11 is a pulse detection circuit for converting a signal detected by the feeding photo reflector 1 into a signal corresponding to the microcomputer 8, 12 is a magnetic information writing circuit for transferring a record signal of the photographing information onto the track T of the film F to the magnetic head, 13 is a magnetic reproduction circuit for reproducing the magnetic information written on the track T of the film F, 14 is an AE, AF and SH circuit for performing the well-known photometry, rangefinding and photographing operation, and 15 is a film counter for storing and displaying the frame number of a film.

Figure 3:
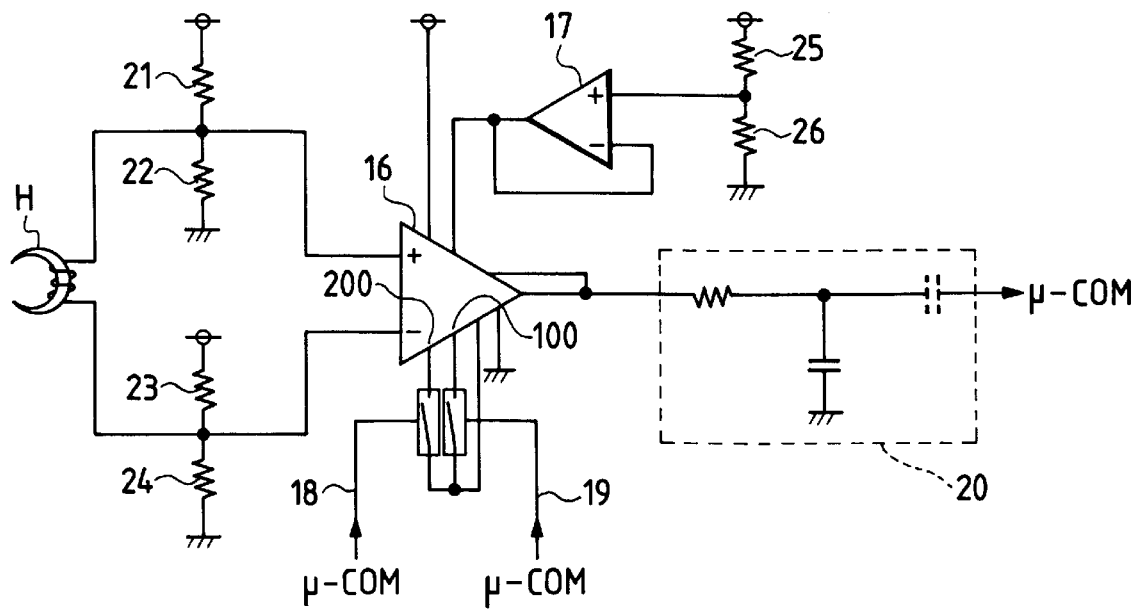
FIG. 3 is a circuit diagram illustrating the details of a magnetic reproduction circuit 13 of FIG. 2.

FIG. 3 is a diagram showing the details of the magnetic reproduction circuit 13 of FIG. 2 in which 16 is an instrumentation amplifier (e.g., AD624) for transducing the output of the magnetic head H into a signal, 17 is an operational amplifier for offsetting the output of this instrumentation amplifier 16, 18, 19 are analog switches for switching the gain of the instrumentation amplifier 16, 20 is a filter for removing the noise output from the instrumentation amplifier 16, and 21 to 26 are bias resistors.

In FIG. 3, a variation in the magnetic flux on the track T of the film is detected as an electric signal by the magnetic head H, which signal is then input to the instrumentation amplifier 16. The electric signal input into the instrumentation amplifier 16 is amplified by the amount of a gain of the instrumentation amplifier 16, which is set in accordance with the type of the film upon turning on or off of the analog switches 18, 19, offset by the amount of an output of the operational amplifier 17 and output from the instrumentation amplifier 16, so that a signal of detecting only the use frequency band with the filter 20 is transferred to the microcomputer 8.

Figure 4:
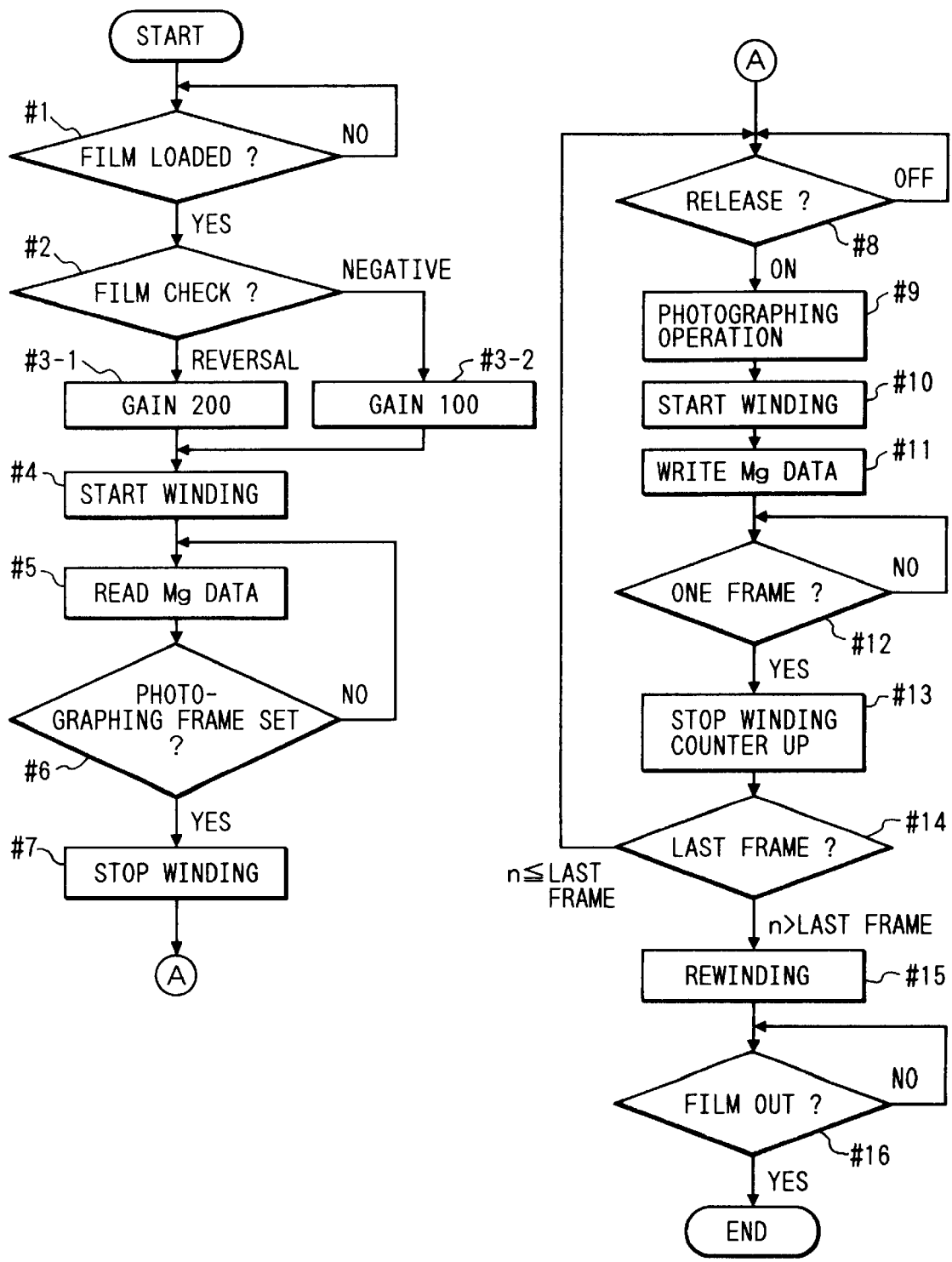
FIG. 4 is a flowchart showing the operation of the camera of FIGS. 1 to 3.

FIG. 4 is a flowchart showing the operation of the camera of FIGS. 1 to 3. According to the flowchart of FIG. 4, the operation of the camera in this example will be described. First, whether or not the cartridge C is loaded into the camera is detected by a film presence/absence switch, not shown (#1). If loaded, the position of the film type determination portion 5 is detected by a film type determination switch, not shown, to determine whether the film is a negative or reversal (#2). The operation goes to #3-1 if the result of determination is reversal, or to #3-2 if it is negative. If the type of the film is reversal, the analog switch 18 of the magnetic reproduction circuit 13 as shown in FIG. 3 is turned on, and the analog switch 19 is turned off, so that the magnetic reproduction circuit 13 is set at a high level gain (e.g., the gain of AD624 is set equal to 200) (#3-1). If the type of the film is negative, the analog switch 18 is turned off, and the analog switch 19 is turned on, so that the magnetic reproduction circuit 13 is set at a low level gain (e.g., the gain of AD624 is set equal to 100) (#3-2). Next, the feeding motor 2 is initiated to start winding the film F (#4), and the magnetic information of the track T is read into the microcomputer 8 by the magnetic head H and the magnetic reproduction circuit 13 (#5). This magnetic information serves to control the photographing operation (e.g., ISO speed). The position of a photographing frame can be determined based on the number of detected perforations P1, P2 detected by the photo reflector 1 and the pulse detection circuit 11 (#6), and the steps of #5 and #6 are repeated until the photographing frame is reached, at which time the winding of the film F is stopped (#7). Then the turning on/off of the release switch 9 is detected (#8), upon which the photographing operation is performed by carrying out the well-known photometry and rangefinding with the AE, AF and SH circuit 14 in the conditions with the magnetic information added (#9).

Next, the winding of the film is started as at #4 (#10). The photographing information is written onto the track T by the magnetic head H and the writing circuit 12 (#11). And whether or not the winding of one frame is completed is determined based on the number of detected the perforations P1, P2 (#12), and if completed, the winding is stopped and the film counter 15 is counted up (#13). And the maximum photographing frame number of the magnetic information and the count number of the film counter 15 are compared. If the count number is less than or equal to the maximum photographing frame number, the operation returns to #8 where the photographing operation is performed again. If the count number is greater, the film F is rewound (#15), and upon the completion of rewinding, the film presence/absence switch is checked (#16). The series of operations is ended by removing the cartridge C.

In the previous example, a method of detecting the film type independently is used. In Japanese Laid-Open Patent Application No. 55-22799, a camera is proposed in which information concerning the film (film speed, frame number, etc.) is recorded as magnetic information on a member movable with the film in a body when the film is fed and, at the operation of the film feeding, the recorded information is read by the movable member. Also in U.S. Pat. No. 5,025,274, it is disclosed that a bar-code information concerning the film is recorded on a rotatable disk. There will be described below an example of determining the film type as well as the ISO speed and the number of photographing frames with the bar code information, without the necessity of any separate member for determining the film type.

Figure 5:
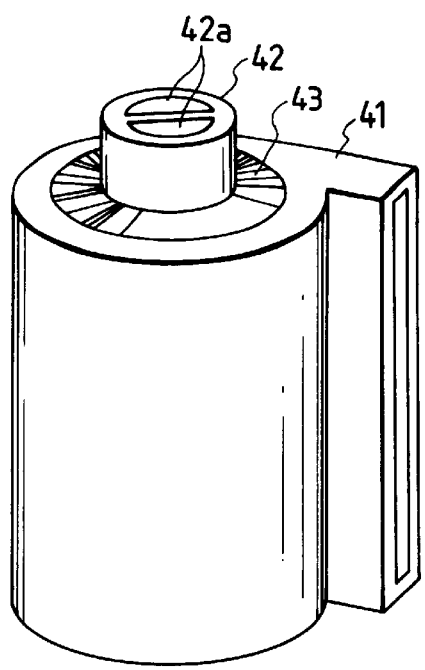
FIG. 5 is a perspective view of a film cartridge C for use in another example of the present invention.

FIG. 5 is a perspective view of a film cartridge C for use in another example of the present invention. In FIG. 5, 41 is a film cartridge, 42 is a spool, 42a is a hole engageable with the fork 4 as shown in FIG. 7, and 43 is a disk having a record of the bar code as to the information of the film which rotates integrally with the spool 42.

Figure 6:
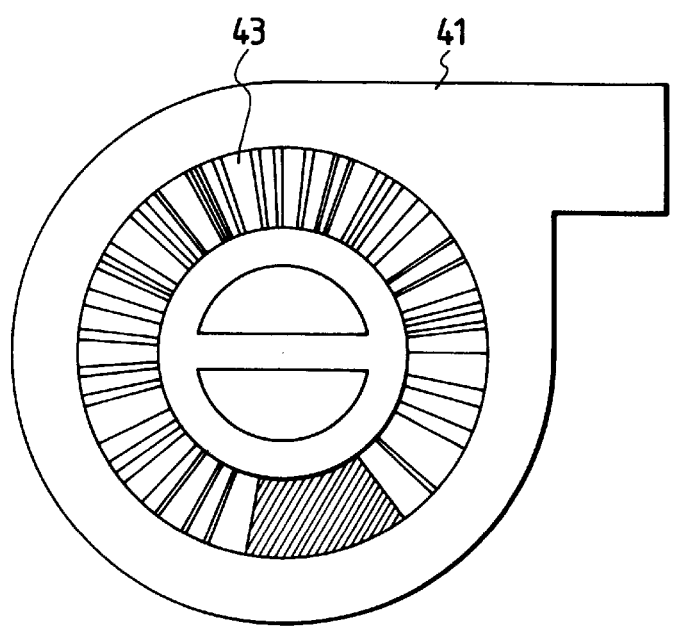
FIG. 6 is a plan view from above of the film cartridge 41 of FIG. 5.

FIG. 6 is a plan view from above of the film cartridge 41 of FIG. 5. Further, FIG. 7 is a rear view of the camera illustrating a state in which the camera using the film cartridge of FIG. 6 in the example is seen from the read side (an outer package is removed for clearness).

Figure 7:
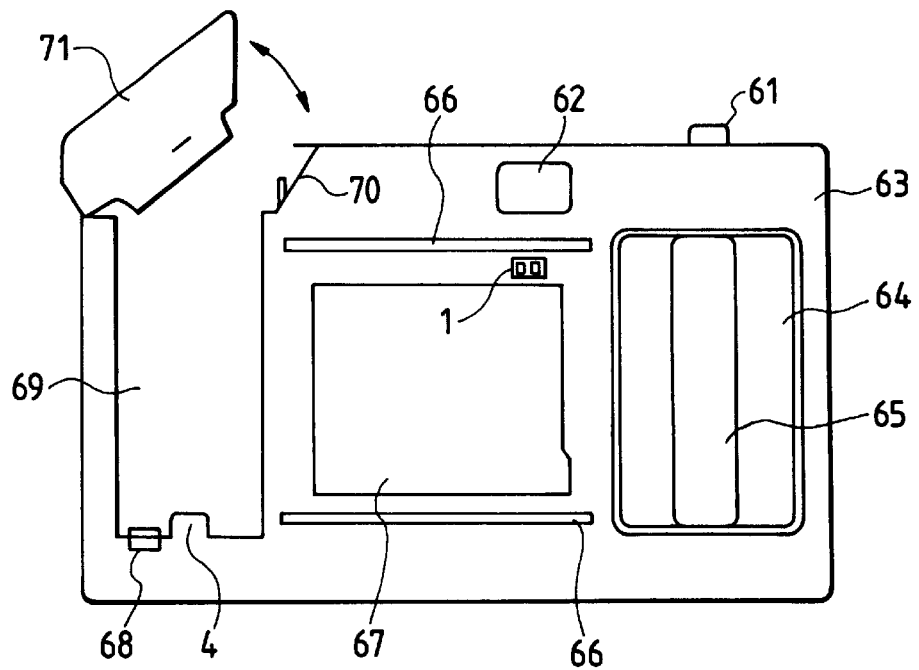
FIG. 7 is a rear view of the camera in the example of FIGS. 5 and 6 illustrating the camera from the rear side (an outer package removed for clearness).
Figure 8:
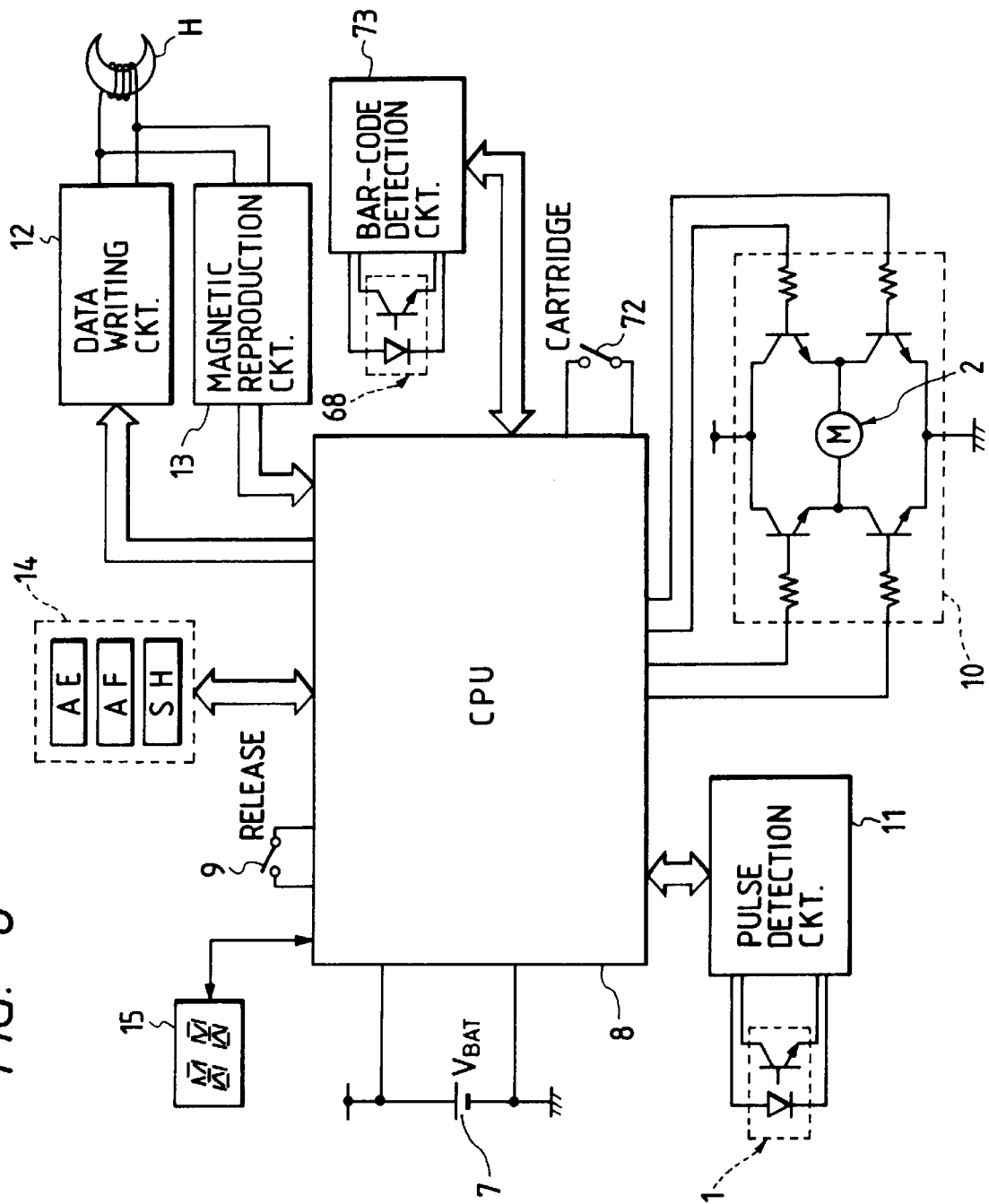
FIG. 8 is an electrical block diagram of the camera of FIG. 7.

In FIG. 7, 61 is a release button, 62 is a finder, 63 is a camera body, 64 is a spool chamber, 65 is a film winding spool, 66 is a film guiding rail, 67 is an aperture for the exposure of the film, 68 is a bar code photo reflector for detecting the bar code of the disk 43 as shown in FIGS. 5 and 6, 69 is a film cartridge chamber, and 70 is a pin for detecting the opening or closing of a film cartridge chamber cover 71, which interlocks with a cartridge chamber cover switch 72 as shown in FIG. 8.

FIG. 8 is an electrical block diagram of the camera as shown in FIG. 7 in which the circuit of FIG. 8 is basically the same as that of FIG. 2, except for the provision of the cartridge chamber cover switch 72, and a bar code detection circuit 73 for detecting a signal of the disk 43 having a record of the bar code by receiving an output of the bar code photo reflector 68 of FIG. 7.

Figure 9:
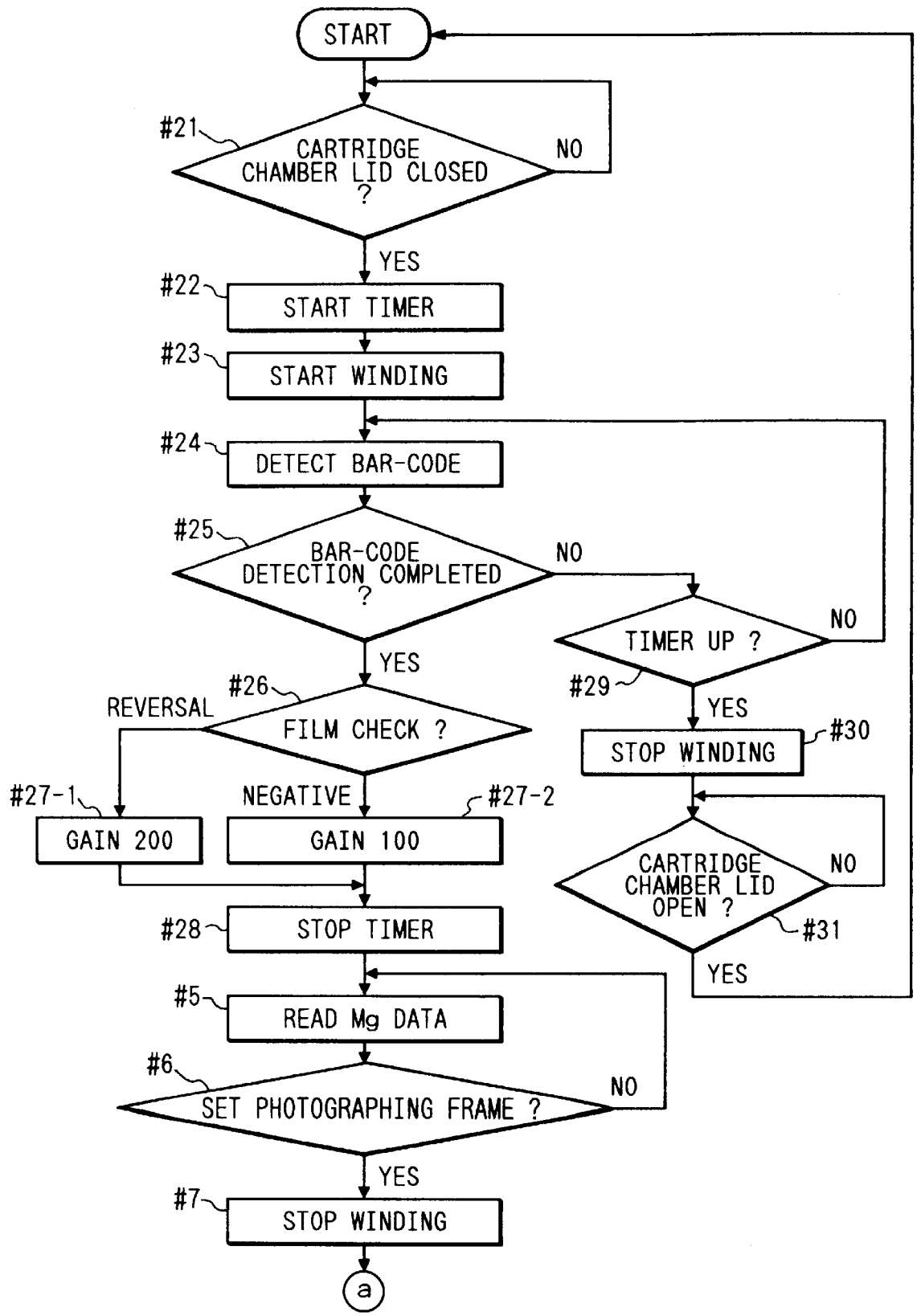
FIG. 9 is a flowchart showing the operation of the camera in the example of FIGS. 5 to 8.
Figure 10:
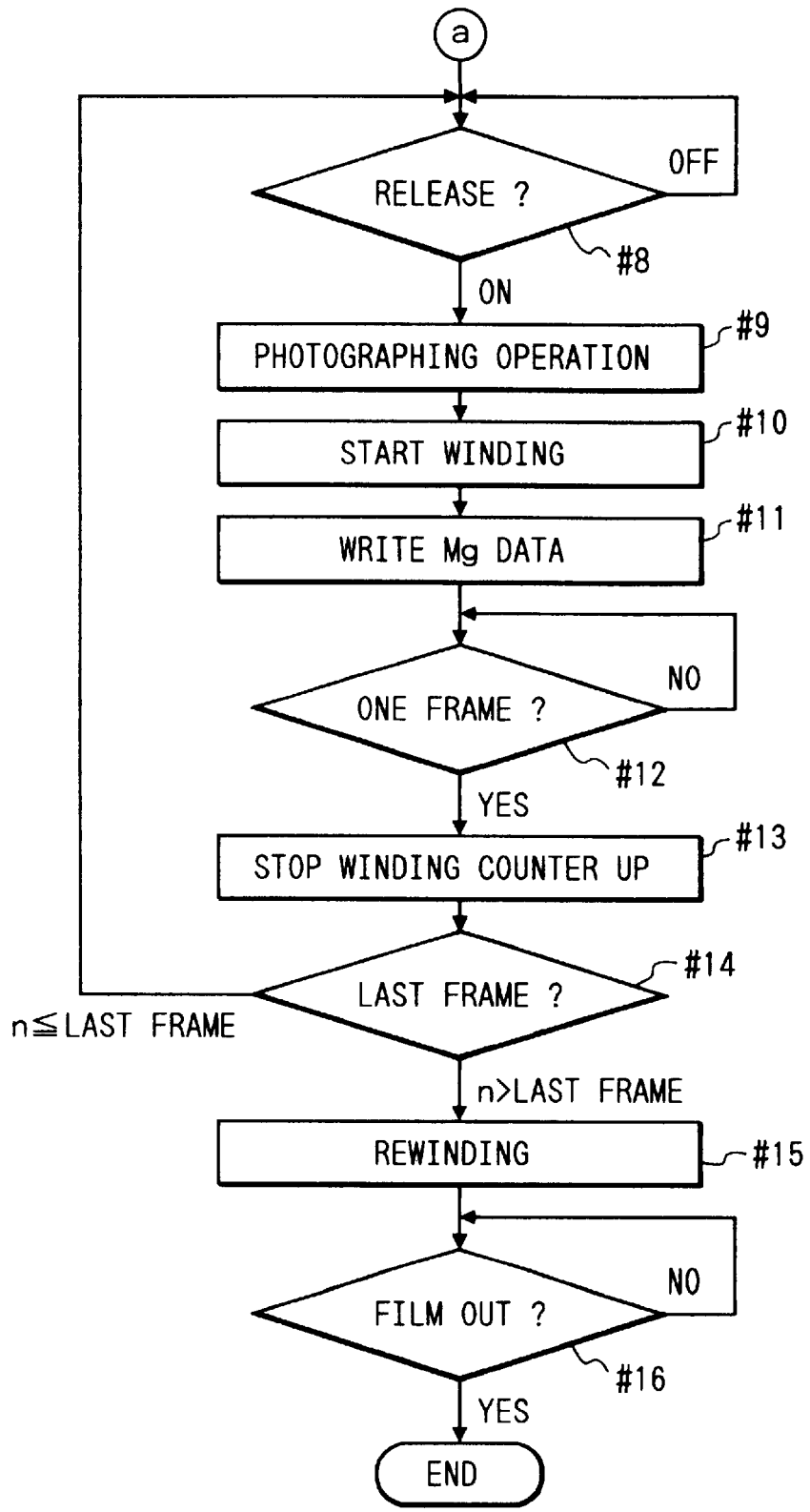
FIG. 10 is a flowchart showing the operation of the camera in the example of FIGS. 5 to 8.

FIGS. 9 and 10 are flowcharts showing the operation of the camera in the example of FIGS. 5 to 8. Referring to FIGS. 9 and 10, the operation will be described below. First, a determination is made with the cartridge chamber cover switch 72, whether or not the cartridge chamber cover 71 is closed (#21). If the cover is closed, a timer for counting a predetermined time so as to rotate the fork 4 a fixed amount is started (#22), and the winding is started by the feed circuit 10 (#23). Thereafter, the film information is picked up by the bar code detection circuit 73 (#24), a determination is made as to whether or not the pick up of the bar code information is completed (#25), and the operation goes to #26 if it is completed, or otherwise to #29. At #29, a determination is made whether or not the timer started at #22 has counted the predetermined time (#29). The operation goes to #24 if it has not counted, or to #30 if it has counted the predetermined time, whereby the winding is stopped (#30): A determination is then made whether or not the cartridge chamber cover 71 is opened (#31), which operation is repeated until the cartridge chamber cover 71 is opened. If the pick up of the bar code information is completed at #25, a determination is made as to whether the film is reversal or negative, based on the film type information of the bar code information picked up at #24. As a result, if the film is reversal, the analog switch 18 is turned on, and the analog switch 19 is turned off, so that the magnetic reproduction circuit 13 is set at a high gain (e.g., the gain of AD624=200) (#27-1). If the film is negative, the analog switch 18 is turned off, and the analog switch 19 is turned on, so that the magnetic reproduction circuit 13 is set at a low gain (e.g., the gain of AD624=100) (#27-2). Then, the timer started at #22 is stopped and reset (#28). The description of the subsequent operation will be omitted as it is the same as in FIG. 4.

Figure 11:
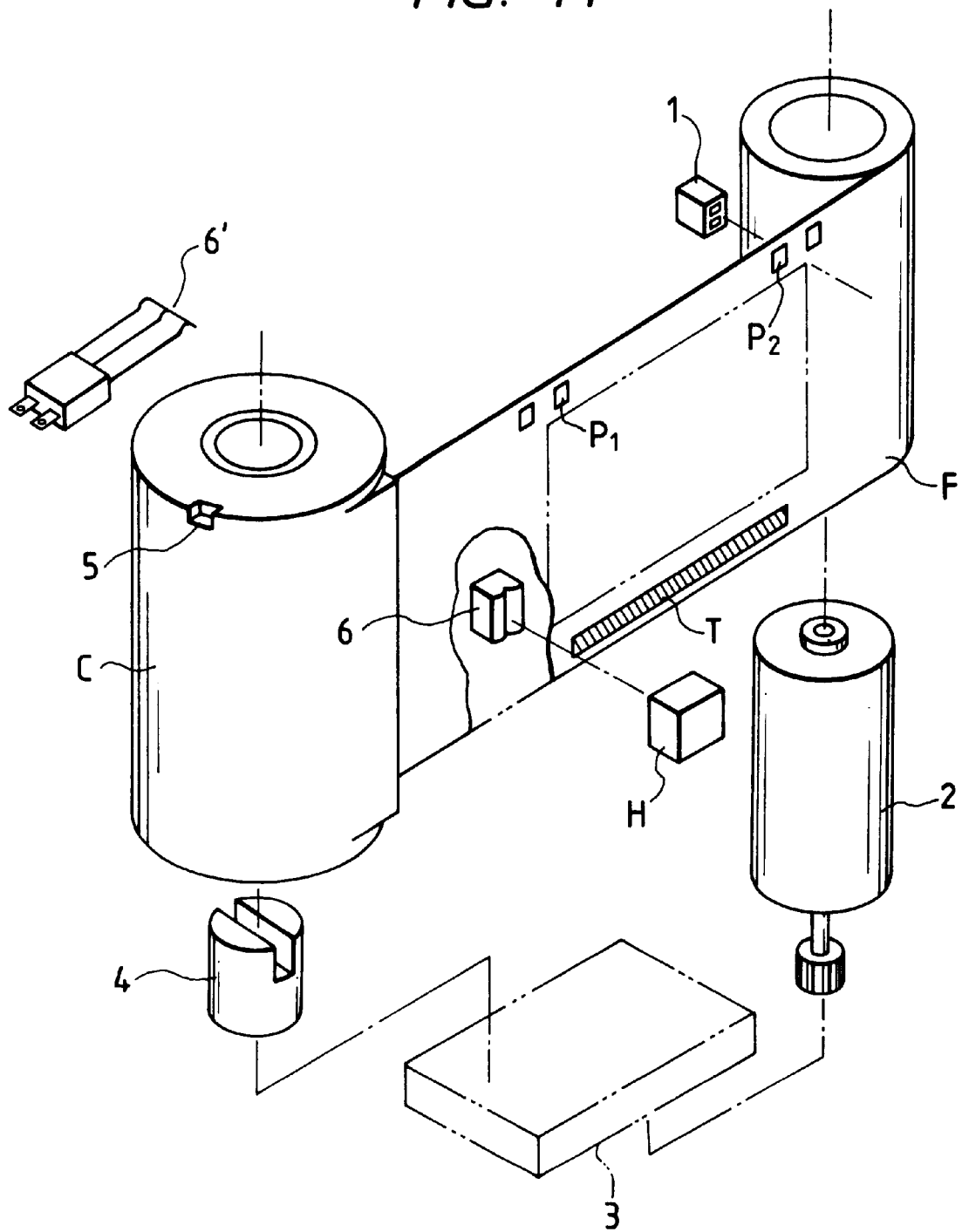
FIG. 11 is a schematic view illustrating the internal constitution of a camera in another example of the present invention.
Figure 12:
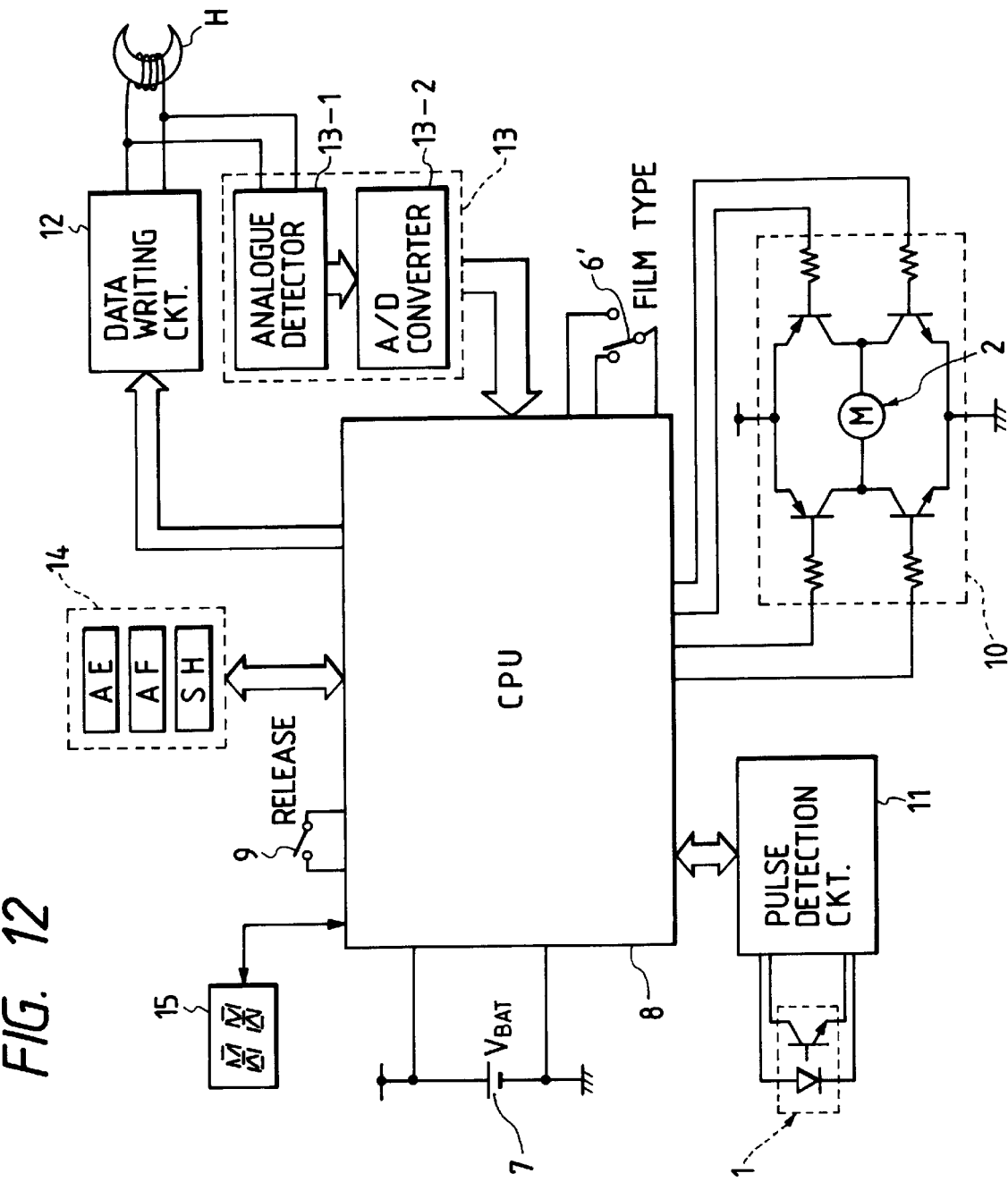
FIG. 12 is a block diagram of a whole circuit of the camera in the example of FIG. 11.

FIGS. 11 to 15 show another example of the present invention, wherein FIG. 11 shows a schematic internal constitution of a camera in this example, and FIG. 12 is a block diagram of the whole camera in this example, the same symbols being attached to the same components as in FIGS. 1 and 2. In the figure, 6' is a film type determination switch for determining the film type based on a film type determination portion 5, 13 is a magnetic reproduction circuit, 13-1 is an analog signal detector, and 13-2 is an analog-digital converter (A/D converter).

Figure 13:
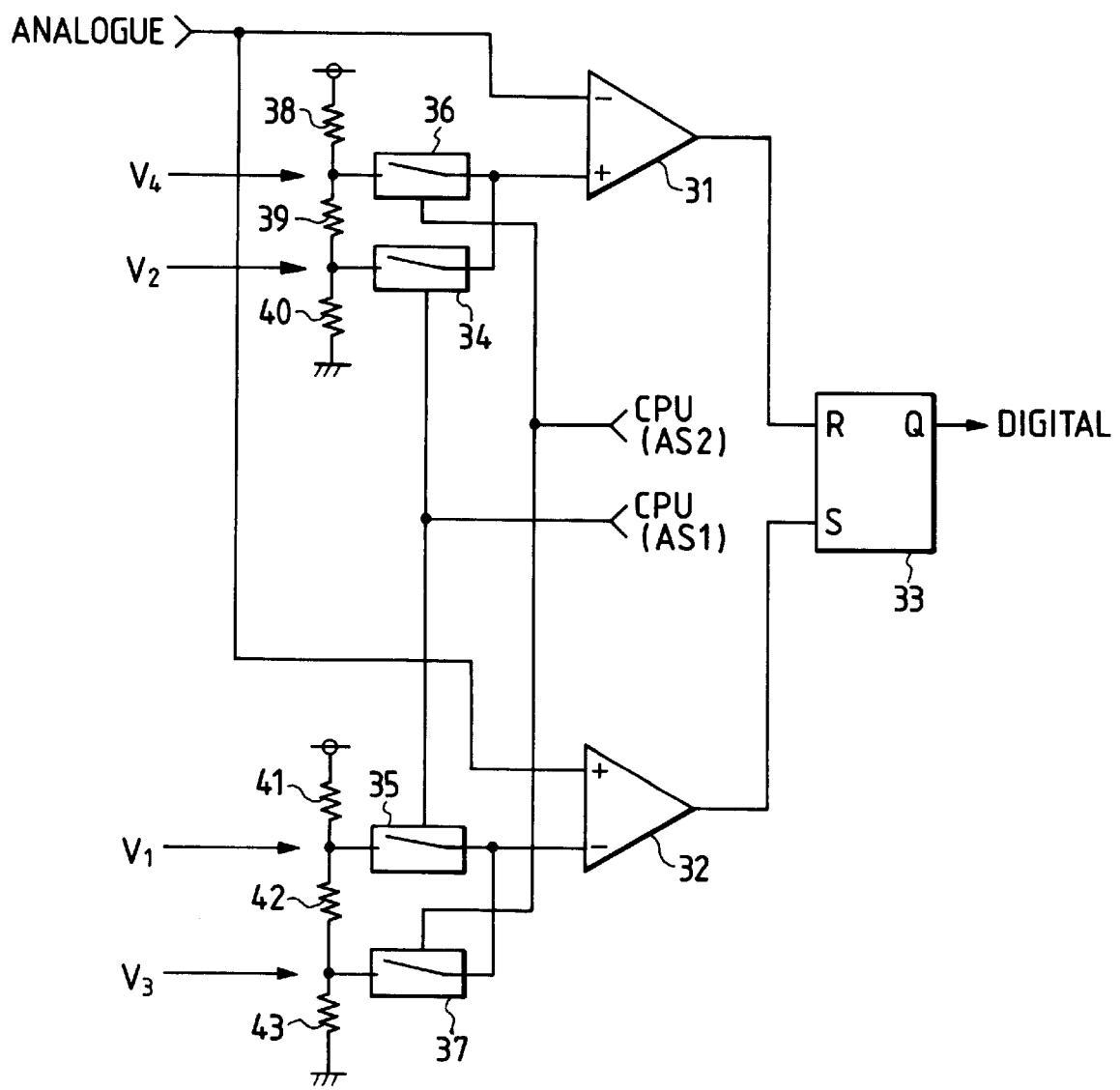
FIG. 13 is a circuit diagram showing the details of an A/D converter 13 of FIG. 12.

FIG. 13 is a circuit diagram showing the details of the A/D converter 13-2 of FIG. 12. 31, 32 are comparators for digitizing an upper analog signal and a lower analog signal, respectively, to convert an analog signal detected with the analog signal detector 13-2 into digital form, 33 is an RS flip-flop circuit for converting the upper signal and the lower signal digitized by the comparators 31, 32 as above mentioned into the digital signal (binary form), 34 to 37 are analog switches for switching the signal reversal level of the comparators 31, 32 under the control of a microcomputer 8, and 38 to 43 are resistors for setting the signal reversal level of the comparators 31, 32. Note that V1 to V4 are signal reversal level voltages for the comparators 31, 32.

Figure 14A:
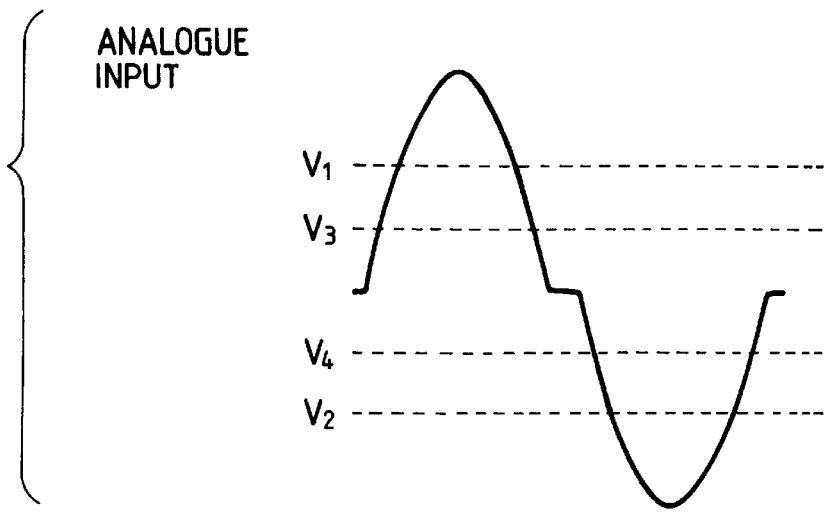
FIGS. 14A to 14C are waveform charts illustrating respectively the output waveforms of various portions of FIG. 13.
Figure 14B:
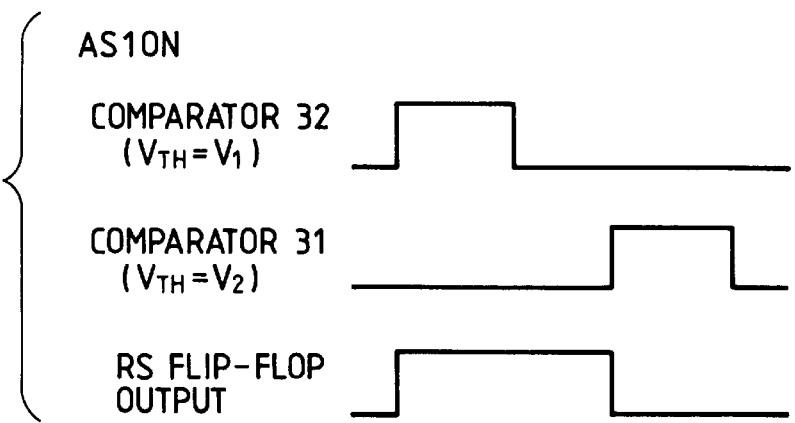
Figure 14C:
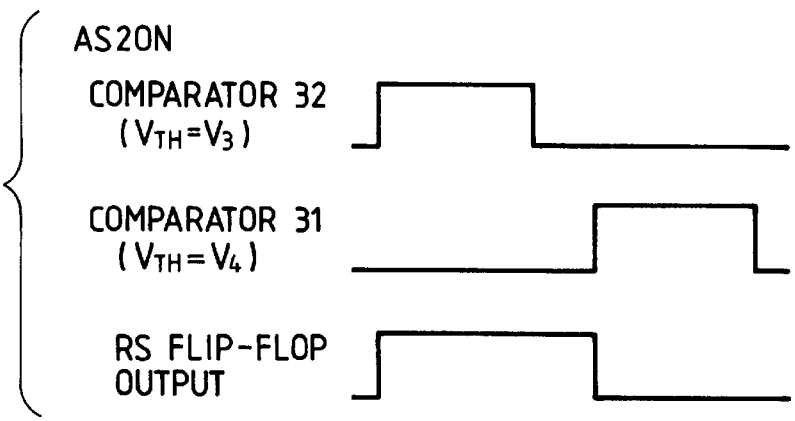

FIG. 14 are waveform charts showing the output waveforms of various portions of FIG. 13.

The operation with the circuit diagram of FIG. 13 is as follows. A magnetic information signal detected by the magnetic head H, reproduced by the magnetic reproduction circuit 13-1, and amplified is input to the comparators 31 and 32, which then output a signal which is reversed to "High" or "Low" if the input signal is above or at a signal reversal level which is set upon turning on of the analog switches 34, 35 or 36, 37. As will be clear from FIG. 14, the comparator 31 gives a "Low" output if the analog input signal is above or at the reversal level (V2 or V4), or otherwise a "High" output, while the comparator 32 gives a "High" output if the analog input signal is above or at the reversal level (V1 or V3), or otherwise a "Low" output. The outputs of the comparators 31, 32 are input into a reset input terminal and a set input terminal of the RS flip-flop circuit 33, respectively, which outputs a "High" signal if the set input changes from "Low" to "High", or a "Low" signal if the reset input changes from "Low" to "High".

Figure 15:
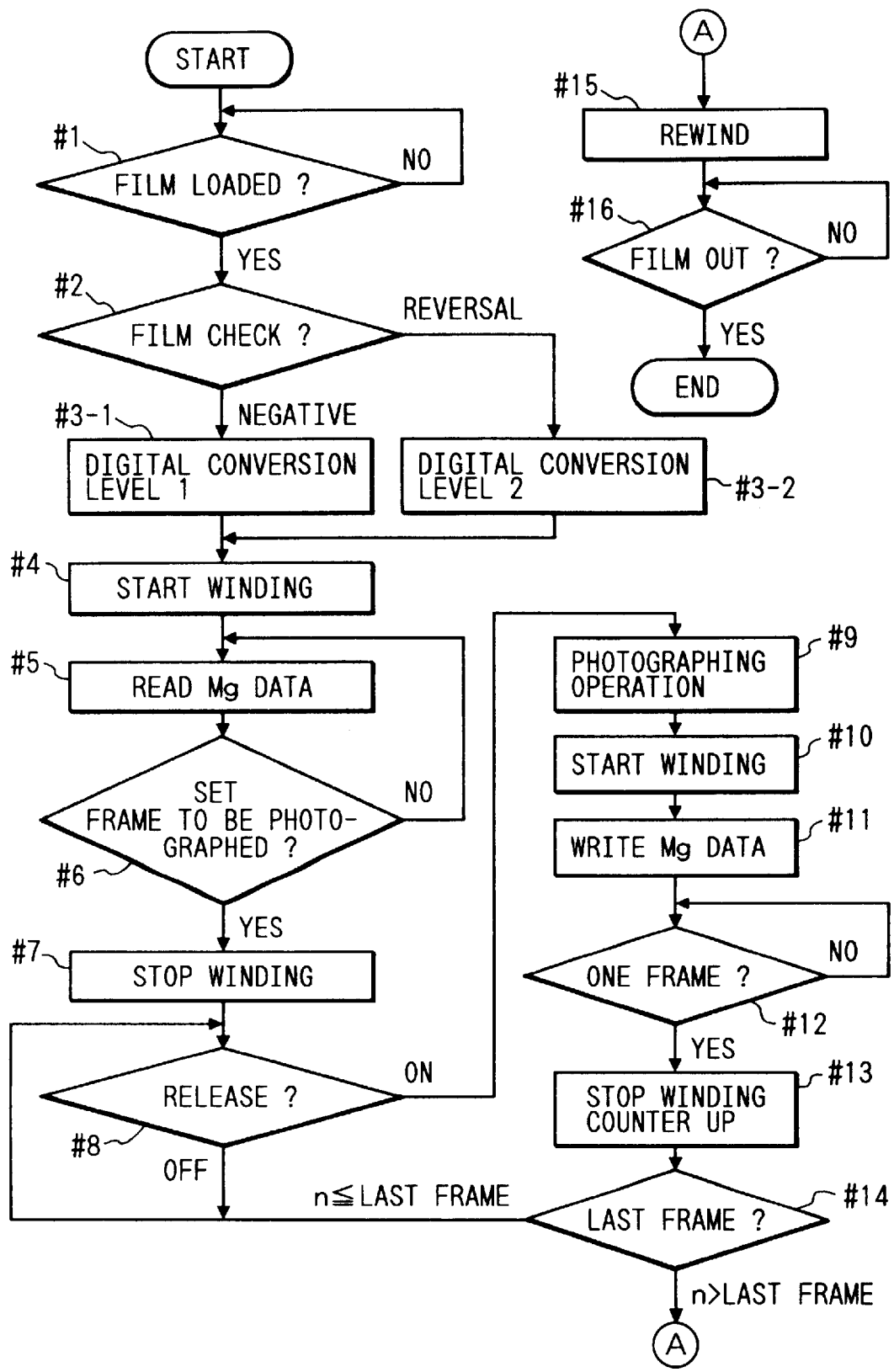
FIG. 15 is a flowchart showing the operation in the example of FIG. 12.

FIG. 15 is a flowchart showing the operation of the camera as shown in FIGS. 11 to 14. First, whether or not the cartridge C is loaded is detected by a film presence/absence switch, not shown. If loaded, the position of the film type determination portion 5 is detected by a film type determination switch to determine whether the film is a negative or reversal. The operation goes to #3-1 if the result is negative, or to #3-2 if it is reversal. If the film type is negative, the analog switches 34, 35 of the magnetic reproduction circuit 13 as shown in FIG. 13 are turned on, and the analog switches 36, 37 are turned off, so that the digital conversion level of the A/D converter 13-2 has a wide range of hysteresis width (V2 to V1 in FIG. 14A) (#3-1).

Also, if the film type is reversal, the analog switches 34, 35 are turned off, and the analog switches 36, 37 are turned on, so that the digital conversion level of the A/D converter 13-2 has a narrow range of hysteresis width (V4 to V3 in FIG. 14A) (#3-2). The feeding motor 2 is initiated to start winding the film F (#4), and the magnetic information of the track T is read into the microcomputer 8 by the magnetic head H and the magnetic reproduction circuit 13. This magnetic information serves to control the photographing operation (e.g., ISO speed). The position of a photographing frame is determined based on the number of detecting the perforations P1, P2 with the photo reflector 1 and the pulse detection circuit 11. The steps of #5 and #6 are repeated until the photographing frame is reached, at which time the winding of the film F is stopped (#7), and the turning on/off of the release switch 9 is detected, upon which the photographing operation is performed by carring out the well-known photometry and rangefinding with the AE, AF and SH circuit 15, in the conditions with the magnetic information added (#9).

Next, the winding of the film is started, as at #4 (#10). The photographing information is written onto the track T by the magnetic head H and the writing circuit 12 (#11). And whether or not the winding of one frame is completed is determined based on the number of detected the perforations P1, P2 (#12). If it is completed, the winding is stopped and the film counter 15 is counted up.

At #14, the maximum photographing frame number of the magnetic information and the count number of the film counter 15 are compared. The operation returns to #8 if the count number is less than or equal to the maximum photographing frame number, or to #15 if the count number is greater. At #15, the film F is rewound (#15), and upon the completion of rewinding, the operation transfers to #16. At #16, the film presence/absence switch is detected. A series of operations are ended by removing the cartridge C.

Figure 16:
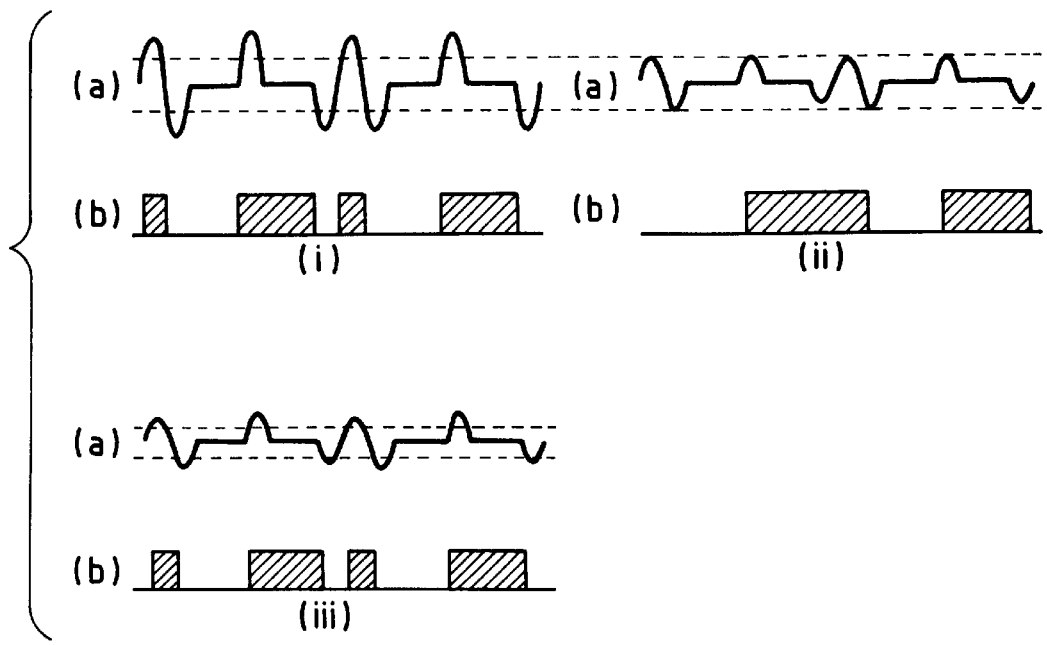
FIG. 16 shows output waveform charts of a magnetic reproduction circuit digital converter of FIG. 13.

FIG. 16 are output waveform charts for (a) analog signal detector 13-1 and (b) analog-digital converter 13-2, the broken line indicating the digital conversion level. Particularly, FIG. 16(*i*) is an output waveform chart in which the magnetic information of a negative film is converted into digital form at the digital conversion level in a wide range corresponding to the negative film, FIG. 16(*ii*) is an output waveform chart in which the magnetic information of a reversal film is converted into digital form in the wide range corresponding to the negative film, and FIG. 16(*iii*) is an output waveform chart in which the magnetic information of the reversal film is converted into digital form in a narrow range corresponding to the reversal film.

As will be seen from the comparison between FIG. 16(*i*) and FIG. 16(*ii*), there is a difference between the negative film and the reversal film having different magnetic layer densities at the level of the analog reproduced signal even with the same magnetic information, so that a conversion error may occur when the digital conversion is made at the same level, but it is possible to prevent the conversion error by making narrower the digital conversion level when the reversal film is reproduced, as shown in FIG. 16(*iii*).

Although not shown, if the external noise is contained in an analog reproduced signal, there is a great possibility that the noise is misjudged as the signal if the digital conversion level is in a narrow range, in which it is possible to reduce the influence of the noise by making the digital conversion level a wider range for the negative film having a greater analog reproduced signal.

In the previously-described examples, there was described means for reducing the information reading error due to the difference of the film type by using two comparators to change the digital conversion level and the hysteresis width, but in the following, there will be described means for reducing the information reading error simply by carrying out the digital conversion having a hysteresis width with one comparator.

Figure 17:
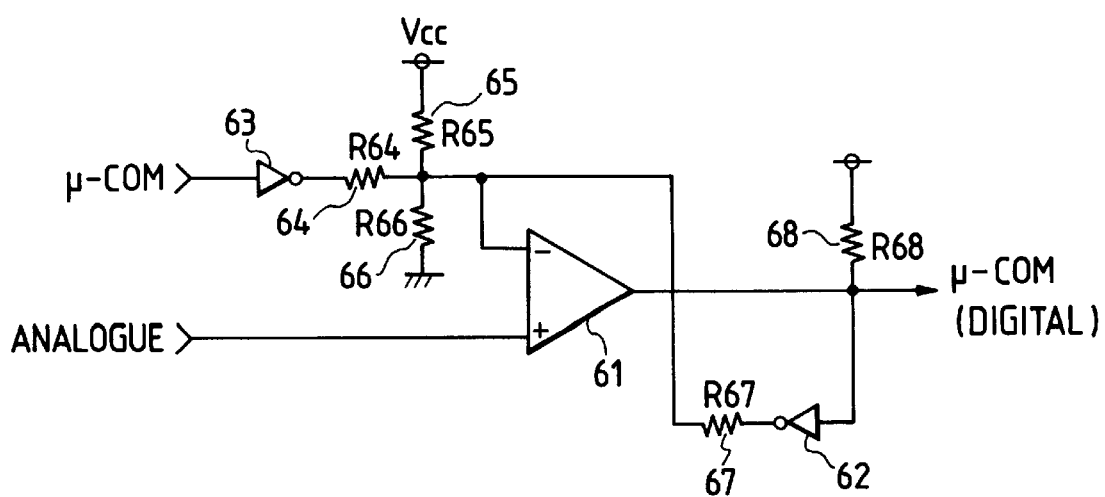
FIG. 17 is a detailed diagram of the magnetic reproduction circuit digital converter in another example of the present invention.

FIG. 17 is a circuit diagram showing the details of an A/D converter 13-2 in another example of the present invention. 61 is a comparator of the open collector type for converting an analog signal detected by the analog signal detector 13-1 into digital form, 62 is an inverter of the open-collector type which is turned on or off with the output of the comparator 61 so as to have a hysteresis width in the comparison voltage of the comparator 61, 63 is an inverter of the open-collector type for controlling the turning on/off of a microcomputer 18 in accordance with the film type, 64 to 67 are resistors for determining the comparison voltage of the comparator 61, and 68 is a pull-up resistor.

The operation of FIG. 17 is as follows.

First, the microcomputer 18 transmits an "L" signal for the negative film or an "H" signal for the reversal film, in accordance with a determination result of the film type, to the inverter 63.

For the negative film, the resistor can be ignored because the output of the inverter 63 is in an open state.

When no signal is input into the comparator 61, or the output of the comparator 61 is "L", the output of the inverter 62 becomes the open state, and the resistor 67 is ignored, at which time the comparison voltage VTH1 of the comparator 61 is $$\text{VTH1}=\text{VCC}\times \text{R66}/(\text{R65}+\text{R66}).$$

If an analog signal exceeding this comparison voltage is input into the comparator 61, the output of the inverter 62 becomes "L", and the resistor 67 is connected in parallel with the resistor 66, at which time the comparison voltage VTH2 of the comparator 61 is $$\text{VTH2}=\text{VCC}\times(\text{R66}\times \text{R67})/(\text{R66}+\text{R67})/\{\text{R65}+(\text{R66}\times \text{R67})/(\text{R66}+\text{R67})\}.$$

Figure 18:
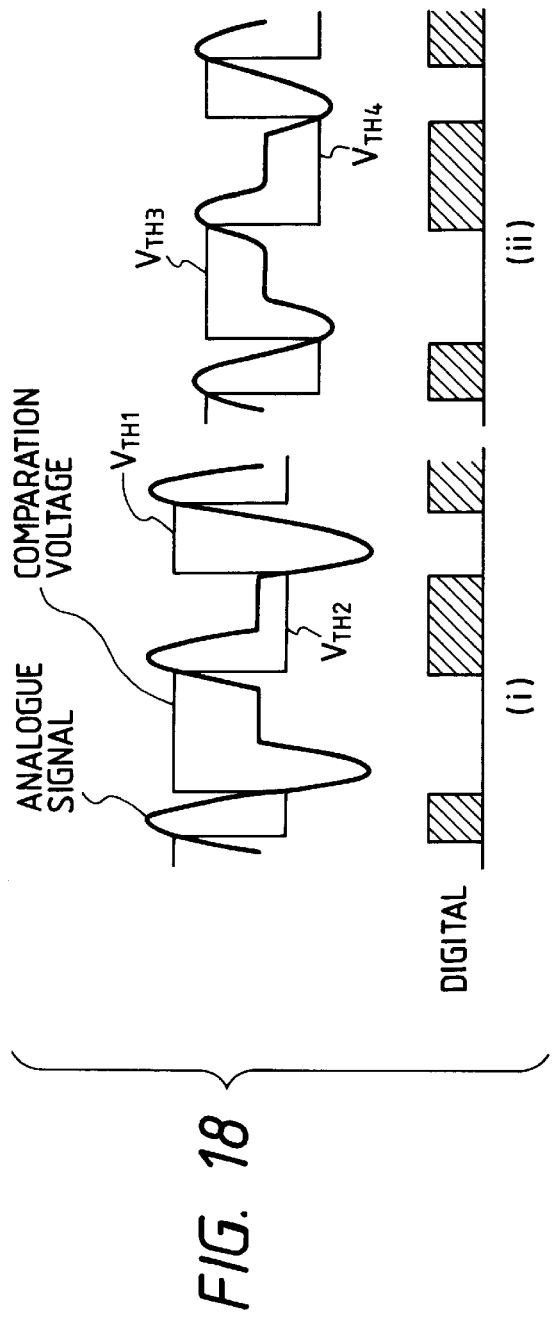
FIG. 18 in output waveform charts of a magnetic reproduction circuit of FIG. 17.

This condition is shown in FIG. 18(*i*).

For the reversal film, on the other hand, the output of the inverter 63 becomes "L", and the resistor 64 is connected in parallel with the resistor 66, so that the comparison voltage VTH3, when the output of the comparator 61 is "L", is $$\text{VTH3}=\text{VCC}\times(\text{R64}\times \text{R66})/(\text{R64}+\text{R66})/\{\text{R65}+(\text{R64}\times \text{R66})/(\text{R64}+\text{R66})\}.$$

The comparison voltage VTH4 when the output of the comparator 61 is "H" is $$\text{VTH4}=\text{VCC}\times\{1(1/\text{R64}+1/\text{R66}+1/\text{R67})\}/[\text{R65}+\{1/(1/\text{R64}+1/\text{R66}+1/\text{R67})\}].$$

This condition is shown in FIG. 18(*ii*).

Figure 20:
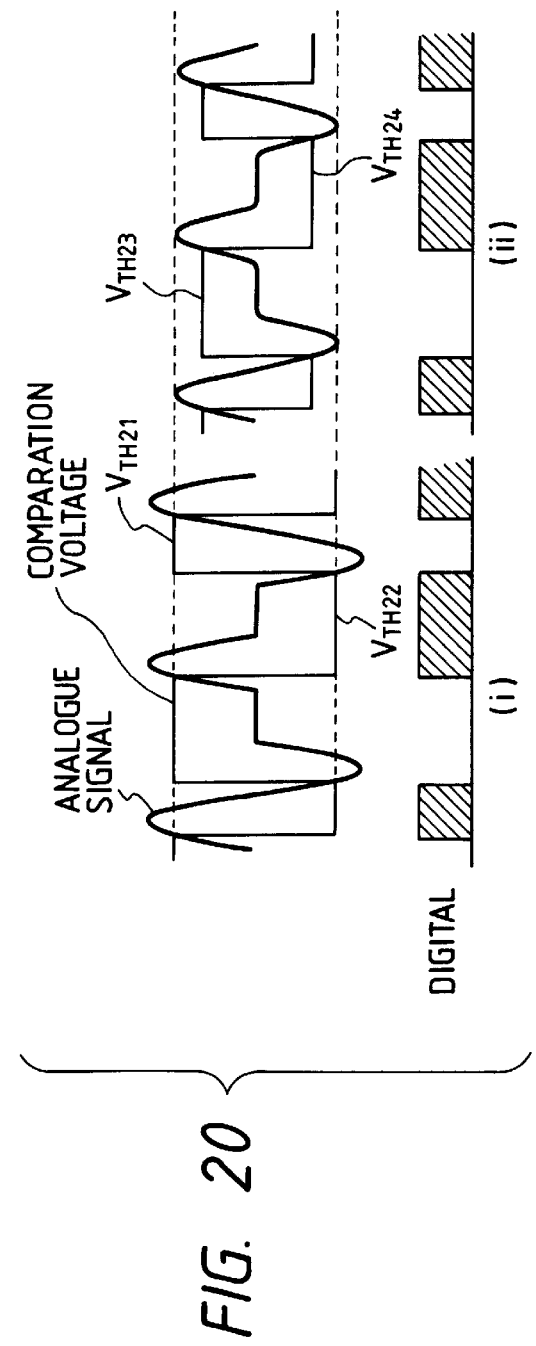
FIG. 20 is waveform charts illustrating an analog signal, a comparator comparison voltage and a digital output waveform in the example of FIG. 19.
Figure 19:
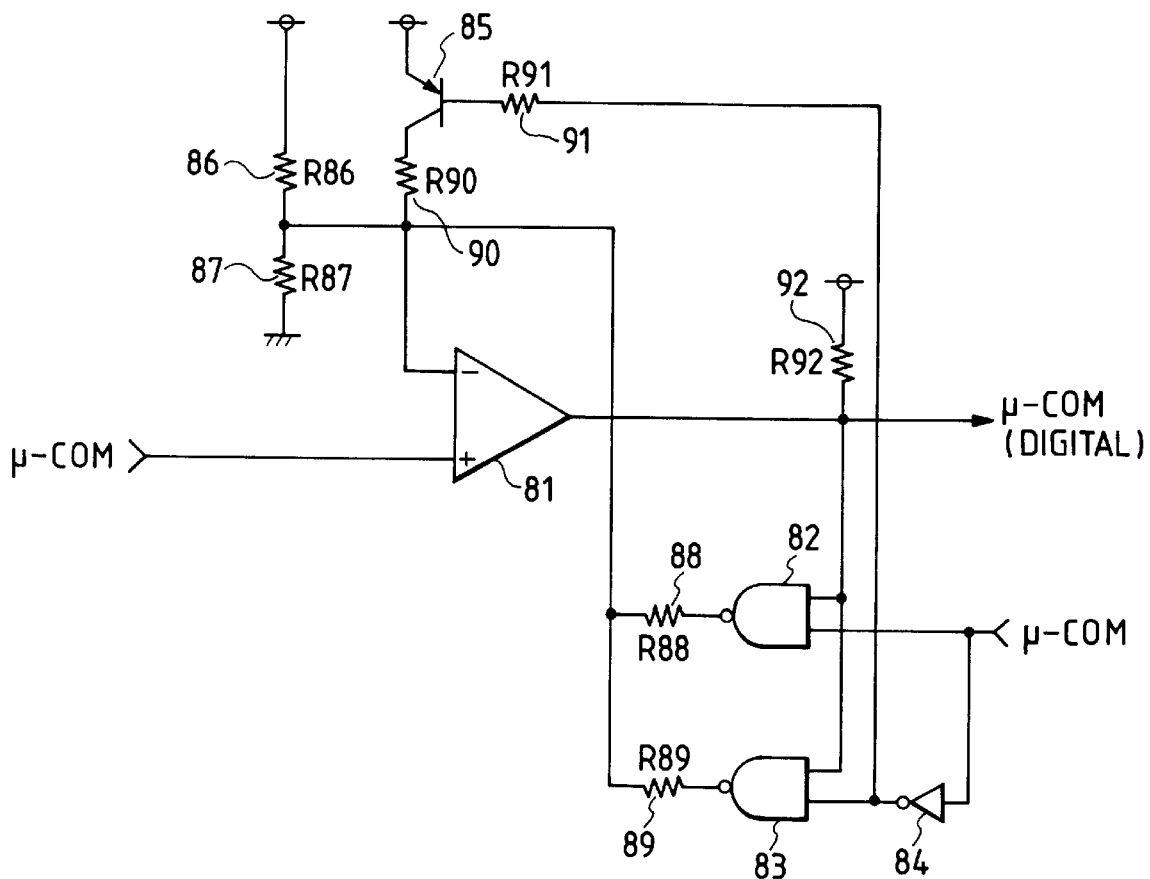
FIG. 19 is a circuit diagram showing the details of an A/D converter 13-2 in another example.

FIG. 19 is a circuit diagram showing the details of an A/D converter 13-2 in still another example, and FIG. 20 is shows waveform charts showing the analog signal, the comparator comparison voltage and the digital output waveform in the example of FIG. 19.

In FIG. 19, 81 is a comparator of the open-collector type for converting an analog signal detected by the analog signal detector 13-1 into digital form, 82, 83 are NAND circuits of the open-collector type for changing the output condition based on a microcomputer control signal and an output of the comparator 81 to provide a hysteresis width in the comparison voltage, 84 is an inverter for controlling the NAND circuit 83 as well as a PNP transistor 85, 85 is the PNP transistor for controlling the pull-up of a resistor 90 by turning on or off, and 86 to 90 are resistors for determining the comparison voltage of the comparator 81, and 91, 92 are control resistors.

Note that the relation between resistors 88, 90 is R88<R89.

The operation of FIG. 19 is as follows.

First, the microcomputer 18 transmits an "H" signal for the negative film, or an "L" signal for the reversal film, in accordance with the film type determination result, to the NAND circuit 82 and the inverter 84.

For the negative film, the output of the inverter 84 becomes "L", and the PNP transistor 85 becomes an ON, so that the resistor 90 is connected nearly in parallel with the resistor 86.

The NAND circuit 83 is always placed in the open state, because the "L" signal is input from the inverter 84. Also, the NAND circuit 82, the output condition of which is determined by the output of the comparator 81, is placed in the open state, when no signal is input into the comparator 81 or the output of the comparator 81 is "L", and the resistor 88 is ignored, at which time the comparison voltage VTH21 of the comparator 81 is

VTH21=VCC×R87/{(R86×R90)/(R86+R90)+R87)}.

If a signal exceeding this comparison voltage is input into the comparator 81, the output of the NAND circuit 82 becomes "L", the resistor 89 is connected in parallel with the resistor 87, at which time the comparison voltage VTH22 of the comparator 81 is

VTH22=VCC×{(R87×R88)/(R87+R88)}/[{(R86×R90)/(R86+R90)}+{(R87×R88)/(R87+R88)}]

(FIG. 20(i)).

For the reversal film, on the other hand, the output of the inverter 84 is in the open state, and the PNP resistor 85 is in the off state, so that the resistor 90 has no effect on the comparison voltage, and the comparison voltage VTH23 when the output of the comparator 81 is "L" is

VTH23=VCC×R87/(R86×R87).

The comparison voltage VTH24 when the output of the comparator 81 is "H" is

VTH24=VCC×{(R87×R89)/(R87+R89)}/[R86+{(R87×R89)/(R87+R89)}].

(FIG. 20(ii)).

Figure 21:
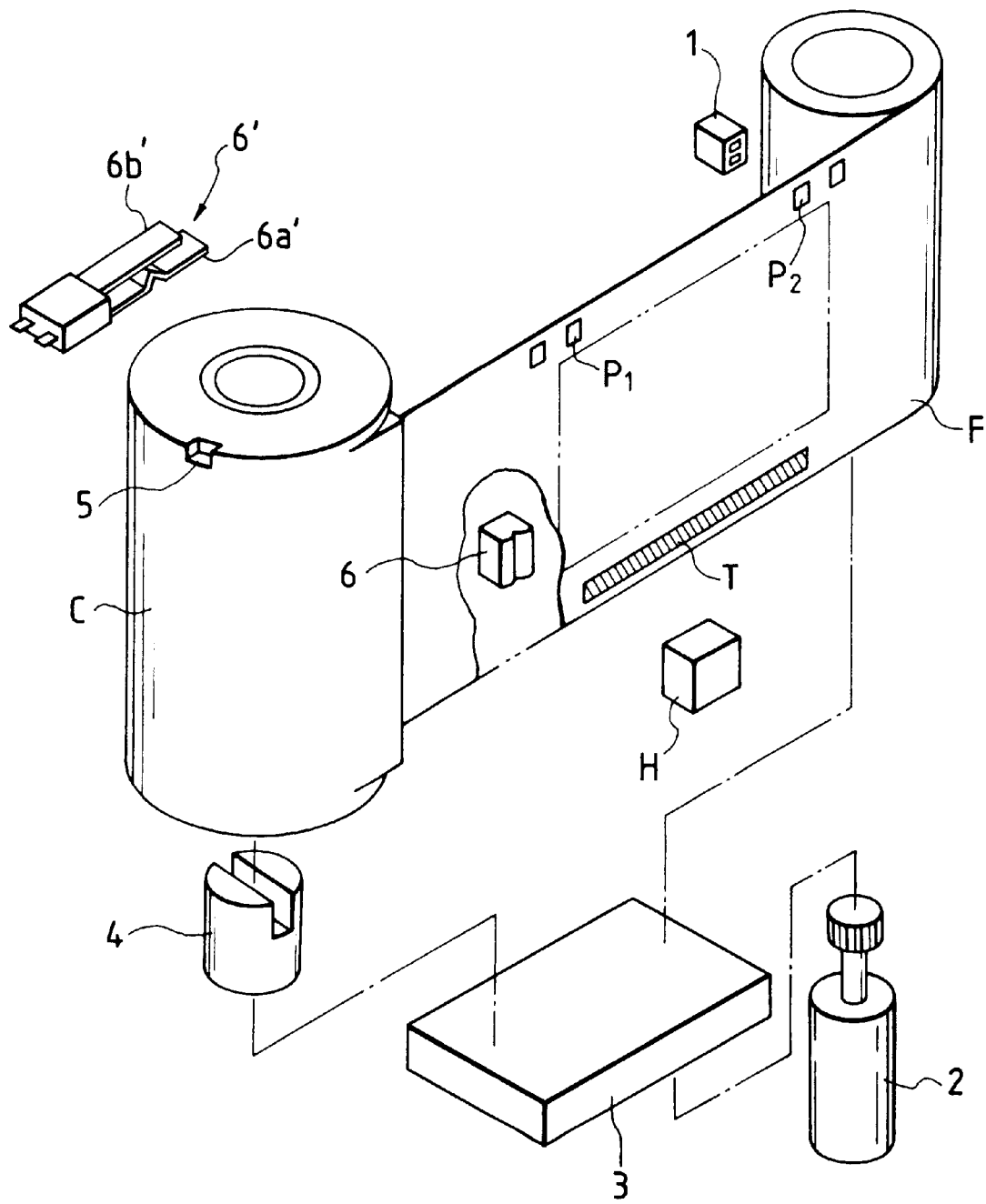
FIG. 21 is a perspective view illustrating a film feed system of the camera in another example of the present invention.

FIGS. 21 to 23, and FIG. 25 show another example of a camera according to the present invention. In FIG. 21, the same symbols are attached to the same components as in the example of FIG. 11.

A method of determining the film type using a film type determination switch 6' will be described below.

The film cartridge C has a cut-out portion 5, for example, on the reversal film but not on the negative film. If the film cartridge C having the cut-out portion 5 is loaded into the camera, a contact piece 6'a of the film type determination switch 6' enters into the cut-out portion 1a so that the contact piece 6'a and a contact piece 6'b are not placed in conduction, while if the film cartridge C without the cut-out portion 5 is loaded into the camera, the contact piece 6'a is deformed by the film cartridge C so that the contact pieces 6'a and 6'b are placed into conduction. That is, the film type determination switch 6' changes its state, depending on whether the film within the film cartridge C is a negative or reversal, and this state change is detected by a control circuit as will be described later to determine the type of the film.

Figure 22:
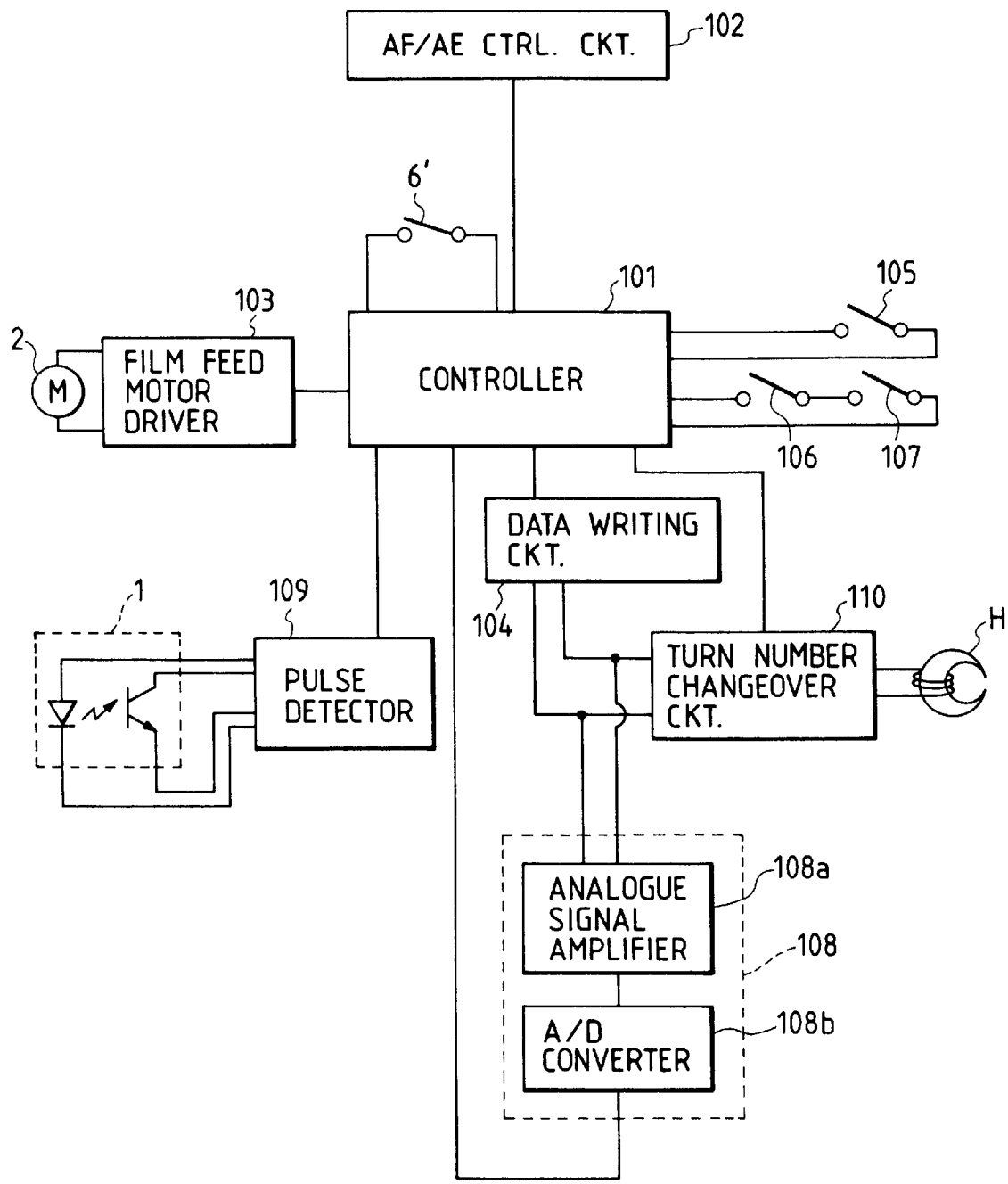
FIG. 22 is a circuit block diagram of the camera of FIG. 21.

FIG. 22 is a circuit block diagram of the camera.

In FIG. 22, 101 is a control circuit constituted of a microcomputer for controlling various operations of the camera, 102 is an AF/AE control circuit for controlling the focusing operation of a taking lens or the operation of an exposure control shutter, 103 is a film feeding motor driver circuit for driving the film feeding motor 2, and 104 is a data writing circuit for performing the writing operation of the information by driving the mangetic head H. 105 is a release switch for releasing the camera by turning on this switch. 106 is a switch which is turned on upon the film cartridge C being loaded into the camera, and 107 is a back cover switch which is turned on upon a back cover being closed, in which the control circuit 101 drives the film feeding motor driver circuit 103 upon turning on of both switches 106, 107 so as to start the setting of the first frame for the film.

108 is a magnetic reproduction circuit for detecting the magnetic information written on a magnetic storage portion T of the film F, amplifying it as an analog signal and converting it into digital form to provide the information for the control circuit 101, and which comprises an analog signal amplifier 108a for detecting the output from the magnetic head H and amplifying its signal, and an A/D converter 108b for converting an amplified analog signal into the digital signal.

109 is a pulse detection circuit for converting a signal detected by a photo sensor 1 into a signal corresponding to the control circuit 101, and 110 is a turn number changeover circuit for changing the coil turn number of the magnetic head H, this circuit being controlled by the control circuit 101.

Next, the operation of the control circuit 101 will be described in accordance with the flowchart of FIG. 23.

If the power of the camera is turned on at step 99, the operation following the step 100 is started.

[Step 100] If both the film cartridge loading switch 106 and the back cover switch 107 are turned on, whether the film cartridge 1 is loaded into the camera is judged. The operation goes to step 101.

[Step 101] A determination is made as to whether or not the film type determination switch 6' has changed state or is turned on. As a result, if it is turned on, the film F is judged to be a negative because the film cartridge C is not provided with the cut-out portion 5, and the operation goes to step 102. If the film type determination switch 6' is not turned on, the film is judged to be a reversal because the film cartridge C is provided with the cut-out portion 5, and the operation goes to step 103.

[Step 102] A reproducing coil of the magnetic head H having a smaller turn number is selected by the turn number changeover circuit 110. Note that the changeover of the coil turn number will be described later in conjunction with FIG. 24.

[Step 103] A reproducing coil of the magnetic head H having a larger turn number is selected by the turn number changeover circuit 110.

When the magnetic recording is reproduced by changing the coil turn number of the magnetic head H in accordance with the type of the film F, as at steps 102 and 103, the amplitude of the signal input into the analog amplifier 108a is substantially the same, whether the negative film having a dense magnetic layer or the reversal film having a non-dense magnetic layer, is used so that it is possible to resolve the conventional problems.

For this purpose, it is only necessary that the amplification factor of the analog signal amplifier 108a is constant, and there is no necessity of changing the amplification factor with a complex circuit constitution.

[Step 104] The film feeding motor driver circuit 103 is driven, the first frame of the film is set at an aperture position with the film feeding motor 2, and the so-called film idle feeding operation is started.

[Step 105] The magnetic reproducing circuit 108 is driven during the film idle feeding operation so as to read out the film information such as the film speed, the number of film frames, and the film type (negative or reversal) prewritten on the magnetic storage portion T of the film F by the magnetic head H. In this case, the signal amplified by the analog signal amplifier 108a has no difference in the shape from an original signal output from the magnetic head H, this signal being converted into a digital signal by the A/D converter 108b at the next stage, which is then picked up and stored by the control circuit 101.

[Step 106] A determination is made as to whether or not the setting of the first frame is completed via well-known means (e.g., via the detection of the film feed amount with an encoder, or the detection of the motor energizing time or the perforations). Upon determining that the first frame has been set, the operation goes to step 107.

[Step 107] The driving of the film feeding motor driver 103 is stopped and the film feeding motor 2 is stopped.

[Step 108] The state of the switch 105 is determined. If it is on, the operation goes to step 106 because the release has been made.

[Step 109] The photographing operation such as the focusing of the taking lens or the exposure operation with the opening or closing of the shutter is performed by driving the AF/AE control circuit 102.

[Step 110] A comparison is made between the preset number of film frames and the number of already used frames, based on the number of film frames read at the step 105 or through well-known means, so as to determine whether or not there is any remaining film frame. And the operation goes to step 111 if there is any remaining frame, or to step 115 if there is no remaining frame.

[Step 111] The winding of the film to the next aperture position is started by driving the film feeding motor driver circuit 103.

[Step 112] In winding the film F to the next frame, the data writing circuit 104 is driven to write the photographing information, such as the shutter speed, the aperture, or the date of photographing, onto the magnetic storage portion T of the film F with the magnetic head H, or the magnetic reproducing circuit 108 is driven to read the information written on the film F with the magnetic head H.

[Step 113] A determination is made as to whether or not the winding of the film F to the next frame has been completed. The operation goes to step 114 if it is completed, or returns to step 111 if it is not completed.

[Step 114] The winding of the film F is stopped by stopping the driving of the film feeding motor driver circuit 103. Then the operation returns to step 108.

When it is determined that there is no remaining film frame at the step 110, the operation goes to step S115 as previously described.

[Step 115] The rewinding of the film within the film cartridge C is started by driving the film feeding motor driver circuit 103 and rotating the film feeding motor 2 in a direction of rewinding the film.

[Step 116] A determination is made as to whether or not the rewinding of the film F within the cartridge C has been completed. Upon the completion of rewinding, the operation goes to step S117.

[Step 117] A series of operations are terminated by driving the film feeding motor driver circuit 103.

Figure 24:
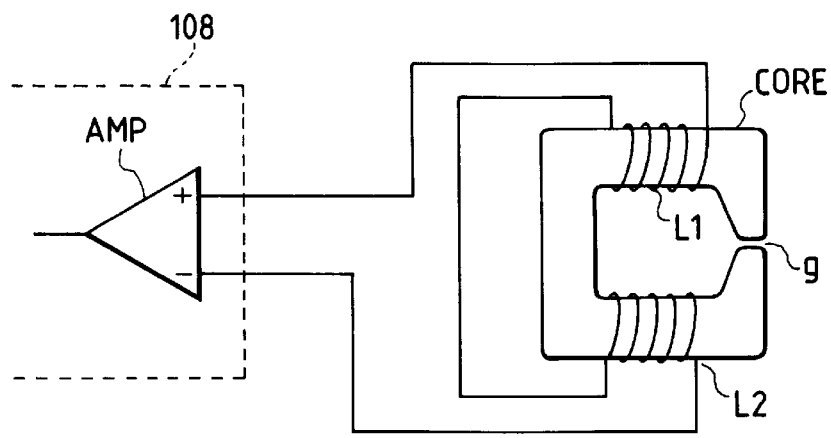
FIG. 24 is a view illustrating the conventional constitution of a magnetic head and a part of a magnetic reproduction circuit.

FIG. 24 is a view illustrating a conventional magnetic head and a part of a magnetic reproduction circuit.

In FIG. 24, AMP is a differential amplifier disposed within the magnetic reproduction circuit, and CORE is a core portion within the magnetic head, with a gap g formed therein. L1, L2 are coils wound around the core portion CORE, respectively, to serve to detect a variation of the magnetic flux in a gap g portion. Two coils of L1 and L2 are provided so as to cancel each other when the external magnetic field arises in a left or right direction in the figure.

Figure 25:
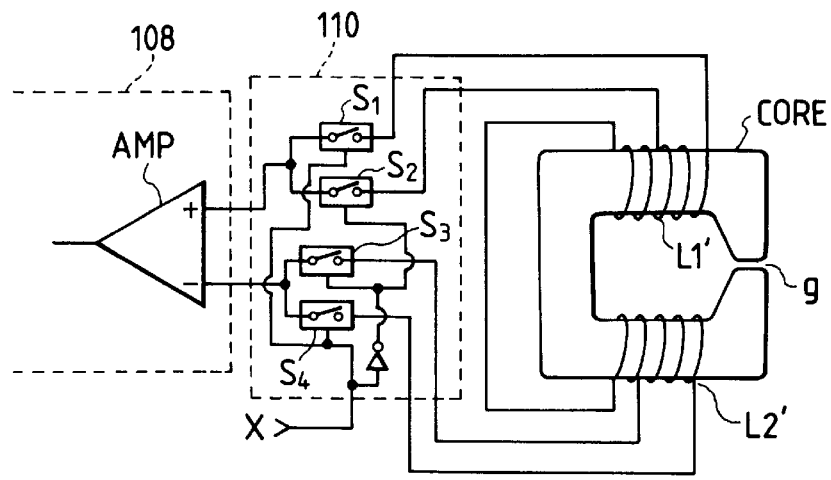
FIG. 25 is a diagram illustrating another constitution of a magnetic head, a part of a magnetic reproduction circuit and a turn number changeover circuit in FIG. 21.

FIG. 25 is a view illustrating the constitution of the magnetic head H and a turn number changeover circuit 110 for use in the present invention.

Coils L1', L2' have intermediate taps, respectively, to control analog switches S1, S2, S3, S4 constituting the turn number changeover circuit 110 in terms of a select signal X of the magnetic head H from the control circuit 101.

Figure 23:
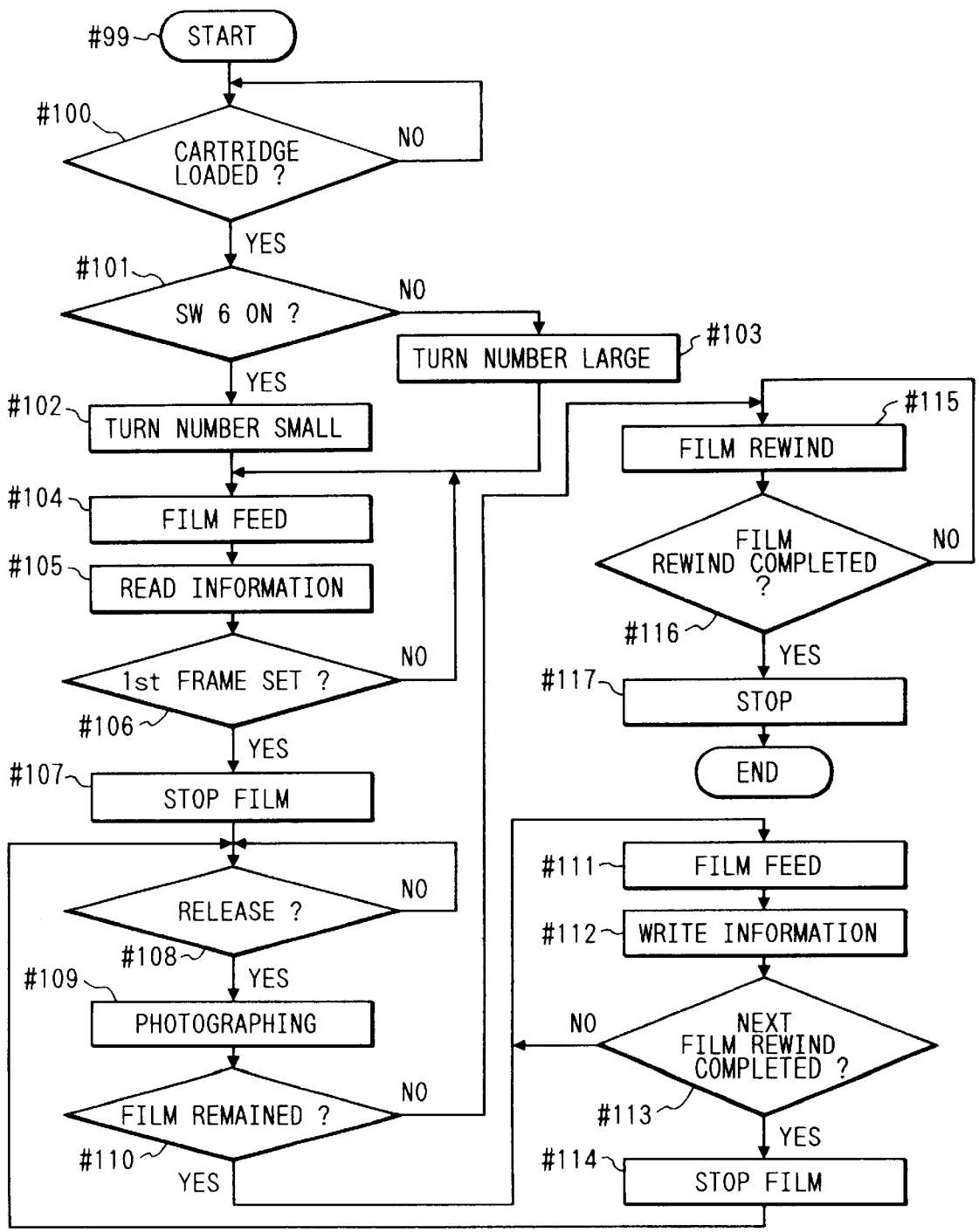
FIG. 23 is a flowchart showing the operation of a control circuit of FIG. 22.

That is, when the coil turn number is desired to be larger, the select signal X is set at "H", so that the analog switches S1, S4 are turned on, and the analog switches S2, S3 are turned off (at step 103 in FIG. 23). On the other hand, if the coil turn number is desired to be smaller, the select signal X is set at "L", so that the analog switches S2, S3 are turned on, and the analog switches S1, S2 are turned off (at step S102 in FIG. 23).

Figure 26:
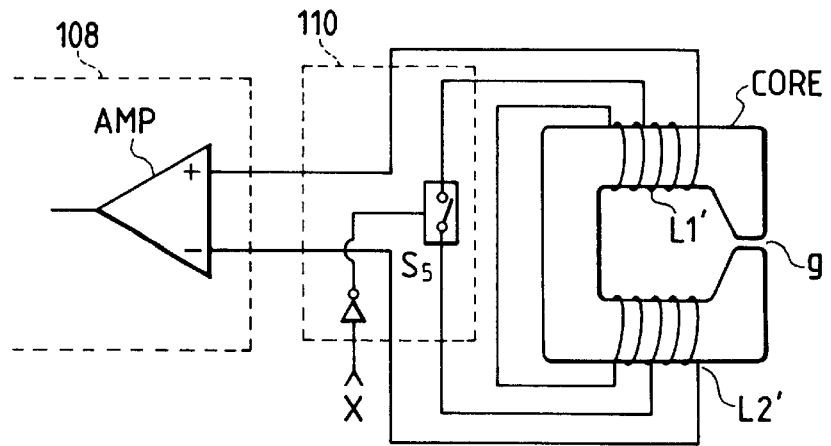
FIG. 26 is a diagram illustrating another constitution of the magnetic head, a part of the magnetic reproduction circuit and the turn number changeover circuit in FIG. 21.

FIG. 26 is a view illustrating the constitution of the turn number changeover circuit 110 which is means for changing the coil turn number of the magnetic head H in another example of the present invention.

This turn number changeover circuit 110 is constituted of an analog switch S5, which is used to short or open the intermediate taps of the coils L1', L2' so that the coil turn number is increased or decreased.

Figure 27:
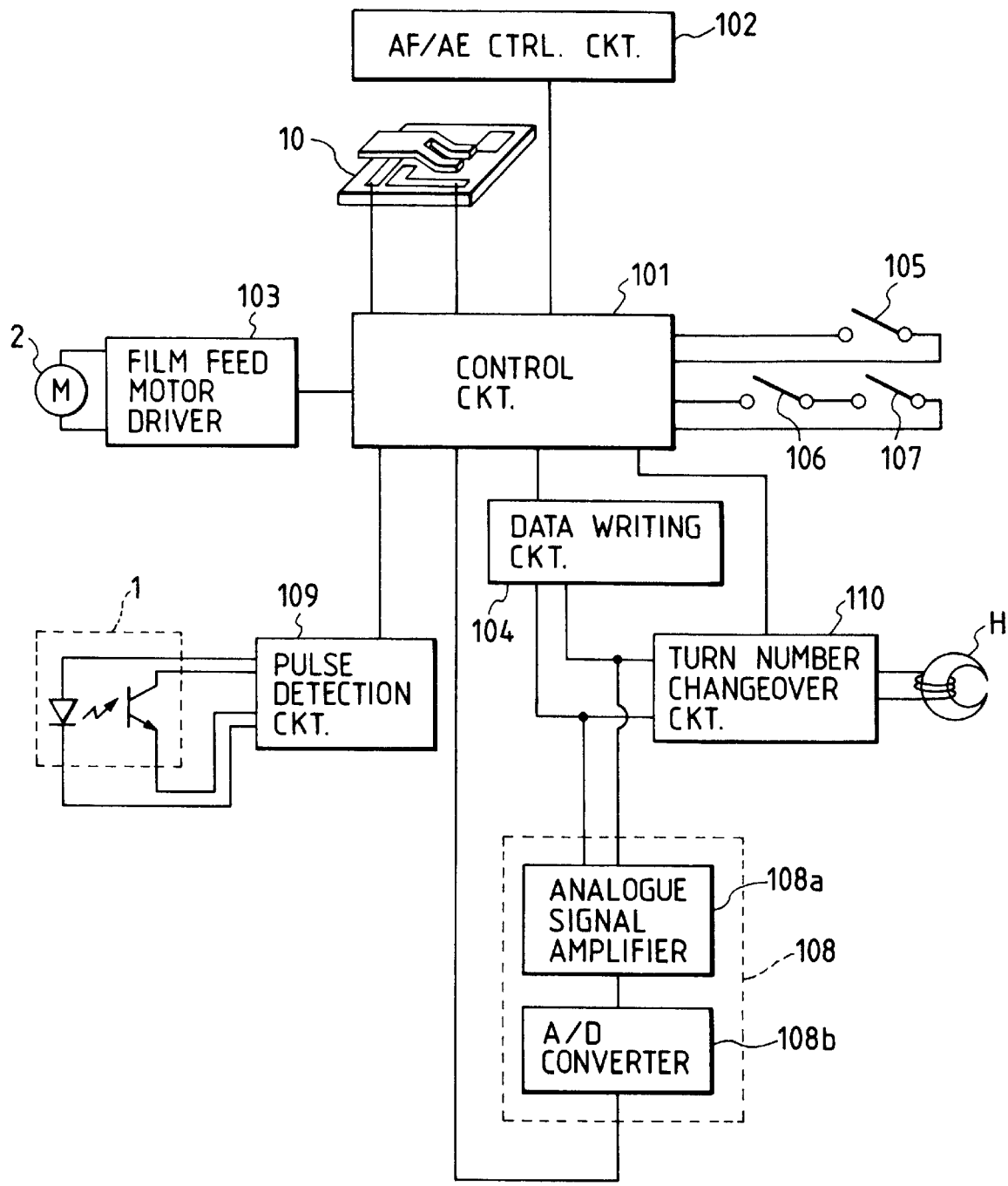
FIG. 27 is a circuit block diagram of the camera in another example of the present invention.

FIG. 27 is a circuit block diagram of the camera showing another example of the present invention, in which the same symbols are attached to the same parts as in FIG. 22.

In FIG. 27, 10 is a slide switch which is manually switched by the user in accordance with the film type, composed of a well-known contact piece and a pattern substrate. In this example, the switch 10 is turned on for the negative film, while it is turned off for the reversal film.

Figure 28:
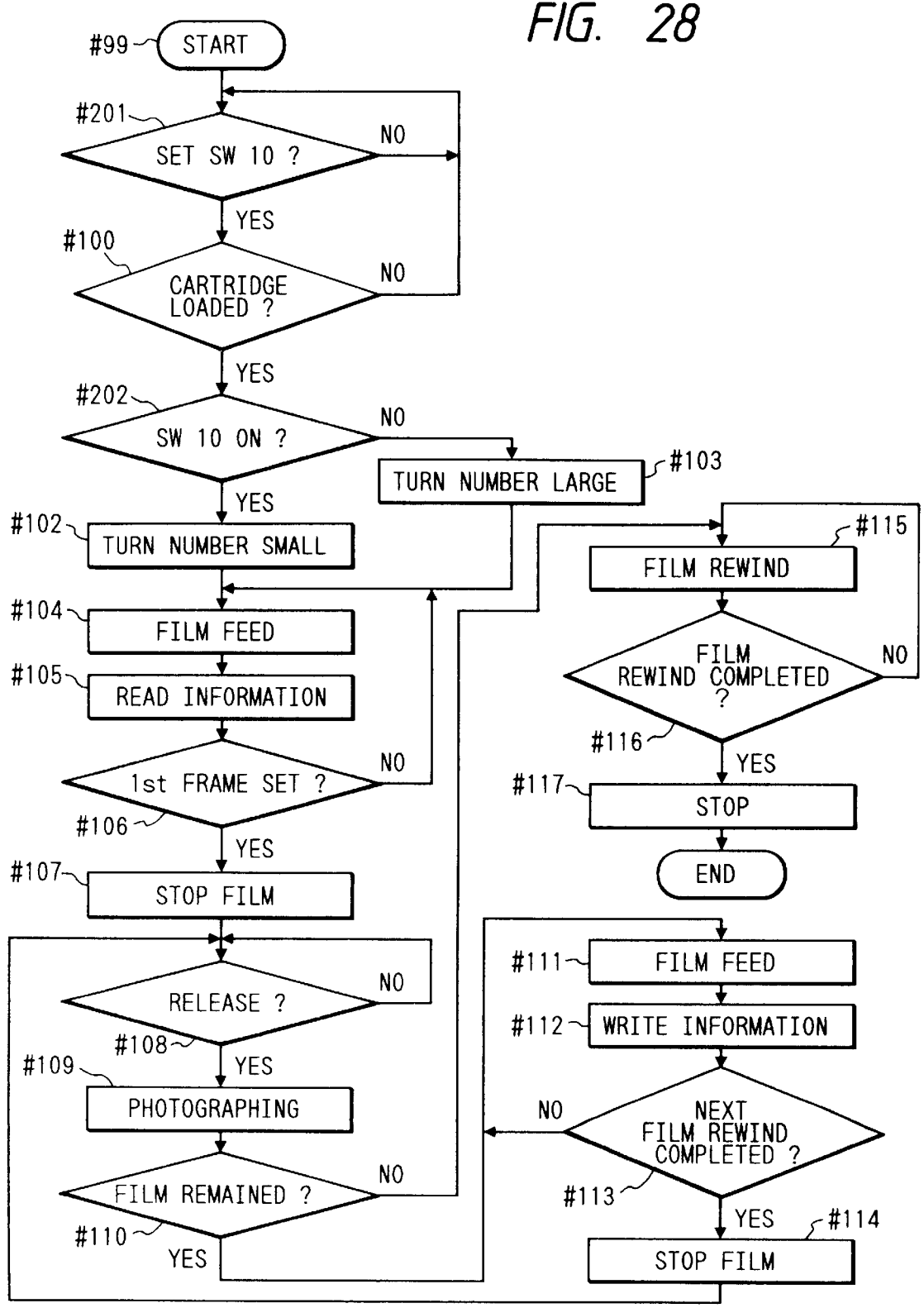
FIG. 28 is a flowchart showing the operation of a control circuit of FIG. 27.

FIG. 28 is a flowchart showing the operation of the control circuit 101 of FIG. 27, in which the same step numbers are attached to the same operation portions as in FIG. 3, and its description will be omitted.

Upon turning on the power for the camera at step 99, the operation at step 201 is started.

[Step 201] A determination is made as to whether or not the switch 10 has been set by the user. If the switch 10 has been set, the operation goes to step 100.

Upon determining at step 100 that the cartridge 1 has been loaded, the operation goes to step 202.

[Step 202] A determination is made as to whether the switch 10 is on or off. The operation goes to step 102 if it is on, or to step 103 if not.

Thereinafter, the same operation as that of FIG. 23 is executed.

In the examples of FIGS. 21 to 28, since the coil turn number of the magnetic head 4 is changed in accordance with the film type, the reproduction level of the magnetically stored information output by the magnetic head is held constant whether the negative film or the reversal film, is used for which the amplification factor of the analog signal amplifier 108a is only necessary to be constant, whereby it is always possible to reproduce the magnetic information excellently, without changing the amplification factor in accordance with the film type with a complex circuit constitution.

Also, an instance of dividing the coil turn number of the magnetic head 4 into two stages was described, but is not limited to two stages, and it will be appreciated that the coil turn number can be switched at three or more stages in the same way.

Figure 29:
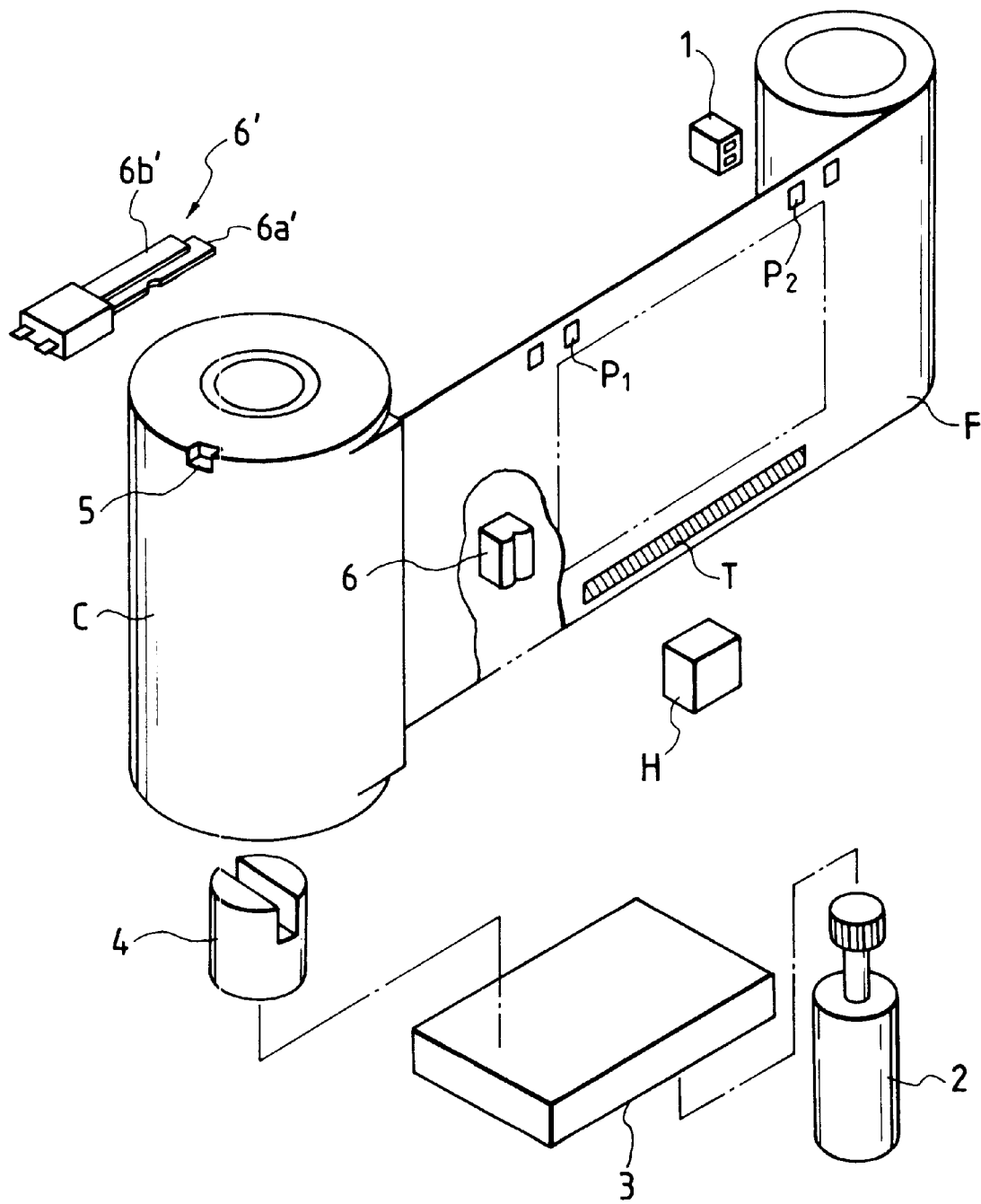
FIG. 29 is a perspective view illustrating the constitution of essential parts of the camera in another example of the present invention.

FIGS. 29 to 32 are views illustrating the mechanical constitutions in another example of the present invention, in which FIG. 29 is a perspective view illustrating a main portion of a camera having the same constitution as in the example of FIG. 21.

A film feeding mechanism 3 for transmitting the output of the film feeding motor 2 to the fork 4 will be described below in detail with reference to FIG. 30.

The film cartridge C for use in this example is constituted in the following manner as proposed in U.S. Pat. No. 4,834,306.

That is, there are provided a film passing slit, a film F having its one end secured to a supply spool and wound around the supply spool, a presser member (not shown) disposed coaxially therewith on the supply spool for regulating the film F with a regulating portion so that the most outer periphery of the film F may not expand in a radial direction in order to prevent the most outer periphery of the film F from substantially making contact with an inner wall of the film cartridge, a releasing portion for continuously releasing the most outer periphery of the film from the regulation with the presser member in the radial direction by deforming a portion of the presser member, and a guiding portion (not shown) for guiding the portion of the film F released from the regulation to the film passing slit, so that there is no sliding between the outer periphery of the film and the presser member by virtue of the expansion of the most outer periphery of the film owing to a slack in winding the film F which is caused by the rotation of the supply spool (not shown) engageable with the fork 4 in a film extruding direction, and a driving force is provided in the film extruding direction to enable the film F to be extruded from the film cartridge C.

The film F is extruded from the film cartridge C with a film feeding mechanism as will be described later, and then wound and fed around a film take-up spool of the camera with well-known means.

Figure 30:
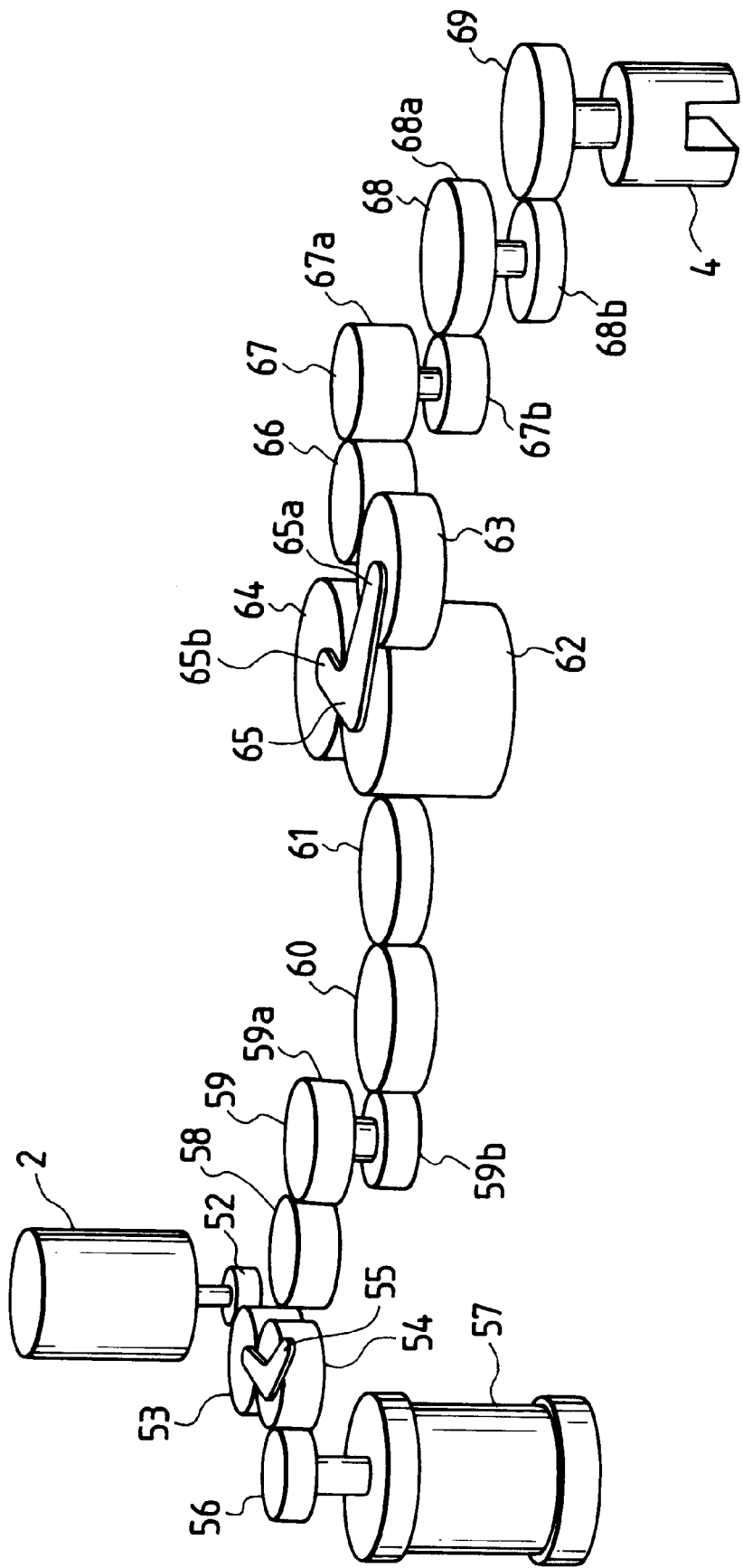
FIG. 30 is a perspective view illustrating a gear train in a film feed mechanism of FIG. 29.

FIGS. 30 to 32 are views illustrating the specific constitutional examples of the film feeding mechanism.

In these figures, 2 is a film feeding motor which rotates in a normal direction (direction of the arrow B in FIG. 31) in winding the film, or in a reverse direction (direction of the arrow C in FIG. 32) in rewinding the film. 52 is a pinion gear secured to a rotational shaft of the motor 2. 53 is a first sun gear mating with the pinion gear 52. 54 is a first planet gear mating with the first sun gear 53. 55 is a first connecting lever for the connection between the first sun gear 53 and the first planet gear 54, holding rotatably the first planet gear 54 with a frictional force produced therewith, and rotating the first planet gear 54 around the first sun gear 53 as a rotational center when the first sun gear 53 is rotated. A well-known epicyclic gearing is constituted of the first sun gear 53, the first planet gear 54 and the first connecting lever 55. 56 is a spool gear mating with the first planet gear 54 only when the film feeding motor 2 rotates in the normal direction. 57 is a film take-up spool secured to the spool gear 56 and moving integrally therewith. 58 is a first idler gear always mating with the first sun gear 53, 59 is a first two-speed gear having a larger gear portion 59a and a smaller gear portion 59b, the larger gear portion 59a mating with the first idler gear 58, 60 is a second idler gear mating with the smaller gear portion 59b of the first two-speed gear 59, 61 is a third idler gear mating with the second idler gear 60, 62 is a second sun gear mating with the third idler gear 61, and 63 is a second planet gear mating with the second sun gear 62. 64 is a third planet gear mating with the second sun gear, like the second planet gear 13. 65 is a second connecting lever for the connection of the second sun gear 62 with the second planet gear 63 and the third planet gear 64 at respective arm portions 65a, 65b, holding rotatably each planet gear with a frictional force produced therewith, and rotating the second planet gear 63 and the third planet gear 64 around the second sun gear 62 as a rotational center when the second sun gear 62 is rotated. A well-known epicyclic gearing is constituted of the second sun gear 62, the second and third planet gears 63, 64 and the second connecting lever 65.

66 is a fourth gear mating with the second planet gear 63 in the counterclockwise rotation around the second sun gear 62 of the second connecting lever 65, but not mating with the third gear 64, when the film feeding motor 2 rotates normally, while mating with the third planet gear in the clockwise rotation of the second connecting lever 65, but not mating with the second planet gear 63, when the motor 2 reversely rotates. 67 is a second two-speed gear having a larger gear portion 67a and a smaller gear portion 67b, the larger gear portion 67a mating with the fourth idler gear 66, 68 is a third two-speed gear having a larger gear portion 68a and a smaller gear portion 68b, the larger gear portion 68a mating with the smaller gear portion 67b of the two-speed gear 67, 69 is a fork gear mating with the smaller gear portion 68b of the third two-speed gear 68, and 70 is a fork rotating integrally with the fork gear 69, whereby the supply spool (not shown) within the film cartridge C is rotated to extrude and wind the film F from the cartridge V.

71 is a stopper provided on a camera body (not shown) for regulating the position of the first connecting lever 55 in the counterclockwise rotation.

With the above constitution, if the film feeding motor 2 (pinion gear 52) rotates in a direction of the arrow B (or normally) as shown in FIG. 31, after the film cartridge C is loaded into a cartridge chamber (not shown), the first sun gear 53 is rotated clockwise, and with the action of the first connecting lever 55, the first planet gear 54 is rotated around the first sun gear 53 as a rotational center to mate with the spool gear 56, so that a driving force of the film feeding motor 2 is transmitted to the spool gear 6 and the film take-up spool 57 is rotated in the clockwise direction.

The driving force is transmitted via the idler gear 58 which is another gear mating with the first sun gear 53, the first two-speed gear 59, the second idler gear 60, and the third idler gear 61 to the second sun gear 62. Hence, the second sun gear is rotated in the counterclockwise direction, and with the action of the second connecting lever 65, the second planet gear 63 and the third planet gear 64 are rotated around the second sun gear as a rotational center, so that the second planet gear 63 mates with the fourth idler gear 66. Thereby, a driving force of the film feeding motor 2 in the direction of the arrow B is transmitted to the fourth idler gear 66 as the rotational force in the counterclockwise direction, which is further transmitted via the second two-speed gear 67 and the third two-speed gear 68 to the fork gear 69, so that the fork 4 is rotated in the clockwise direction.

Here, the gear ratio of a gear train is constituted as follows.

Assuming that the peripheral velocity of the film take-up spool 57 is "V1", and the velocity of the film F extruded from the film cartridge C by the fork 4 is "V2", the relation "V1>V2" stands.

If the film F is extruded from the film cartridge C with the clockwise rotation of the fork 4, a leading end of the film is finally wrapped around the film take-up spool 57 with well-known means (means for catching any of the perforations P of the film F with a claw provided on the film take-up spool 57, or means provided on the camera body for pressing the film F against the film take-up spool 57). After that, it is possible to take up the film F only with the rotation of the film take-up spool 57 produced by the film feeding motor 2, and the reason will be described below.

Once the film F is wrapped around the film take-up spool 57, owing to the relation "V1>V2", the film take-up spool 57 is linked via the film F to the fork gear 69, the third two-speed gear 68, the second two-speed gear 67, and the fourth idler gear 66, in this order, and since the rotational speed of the fourth idler gear 66 in the counterclockwise direction is faster than the rotational speed of the second planet gear 63 in the clockwise direction, the fourth idler gear 66 skips the second planet gear 63, so that the mating between the second planet gear 63 and the fourth idler gear 66 is momentarily released, and its speed difference is absorbed.

Next, the operation of rewinding the film will be described.

Referring now to FIG. 32, if the film feeding motor 2 is rotated in a direction of the arrow C, the first connecting lever 55 and the first planet gear 54 are rotated in the counterclockwise direction around the first sun gear 53 as a rotational center, until an end portion 55a of the first connecting lever 55 comes into contact with the stopper 71. Hence, the mating between the first planet gear 54 and the spool gear 56 is released.

At this time, the second sun gear 62 is rotated in the clockwise direction, whereby the second planet gear 63 and the third planet gear 64 are rotated in the clockwise direction around the second sun gear 62 as a rotational center, with the action of the second connecting lever 65, so that the mating between the fourth idler gear 66 and the second planet gear 63 is released, and instead, the fourth idler gear 66 and the third planet gear 64 are mated. Accordingly, the fork gear 69 is rotated in the counterclockwise direction, so that the supply spool (not shown) within the film cartridge C is reversely rotated with the fork 4, and the film F is wound into the cartrdige C.

Figure 33:
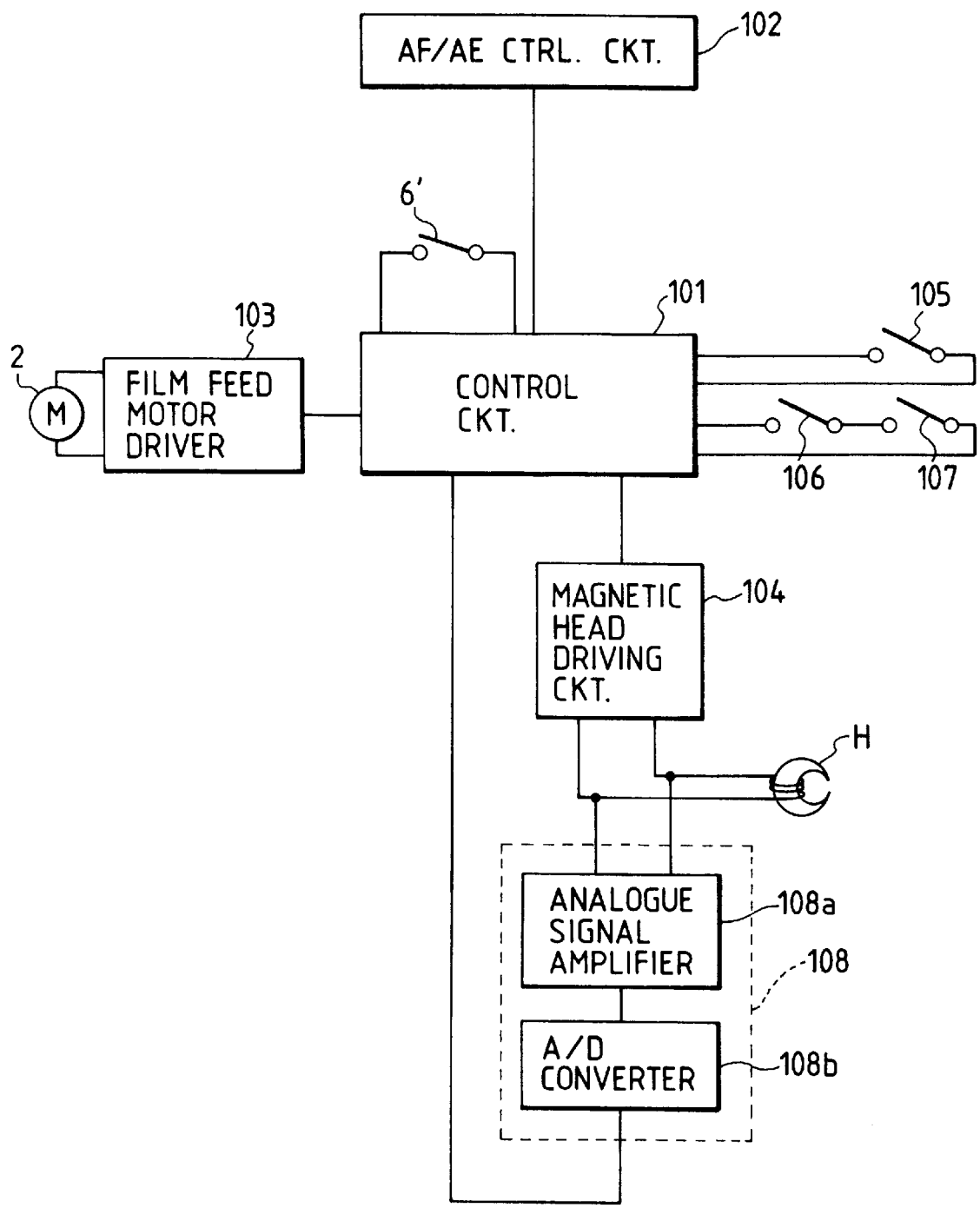
FIG. 33 is a circuit block diagram of the camera in the example of the present invention as illustrated in FIG. 29.

FIG. 33 is a circuit block diagram of the camera of FIG. 29.

In FIG. 33, 101 is a control circuit constituted of a microcomputer for controlling various operations of the camera, 102 is an AF/AE control circuit for controlling the focusing operation of a taking lens or the operation of an exposure control shutter, 103 is a film feeding motor driver circuit for driving the film feeding motor 2, 104 is a magnetic head driving circuit for driving the magnetic head H to write the information, and 105 is a release switch for releasing the camera by turning on this switch. 106 is a cartridge loading switch which is turned on upon the film cartridge C being loaded into the camera, and 107 is a back cover switch which is turned on upon a back cover being closed, in which the control circuit 101 drives the film feeding motor driver circuit 103 upon turning on of both switches 106, 107 so as to start the setting of the first frame for the film F.

108 is a magnetic reproduction circuit for detecting the magnetic information written on a magnetic track T of the film F via the magnetic head H, amplifying it as an analog signal and converting it into digital form to provide the information for the control circuit 101, in and which comprises a signal amplifier 108a for detecting the output from the magnetic head H and amplifying its analog signal, and an A/D converter 108b for converting an amplified analog signal into the digital signal.

Figure 34:
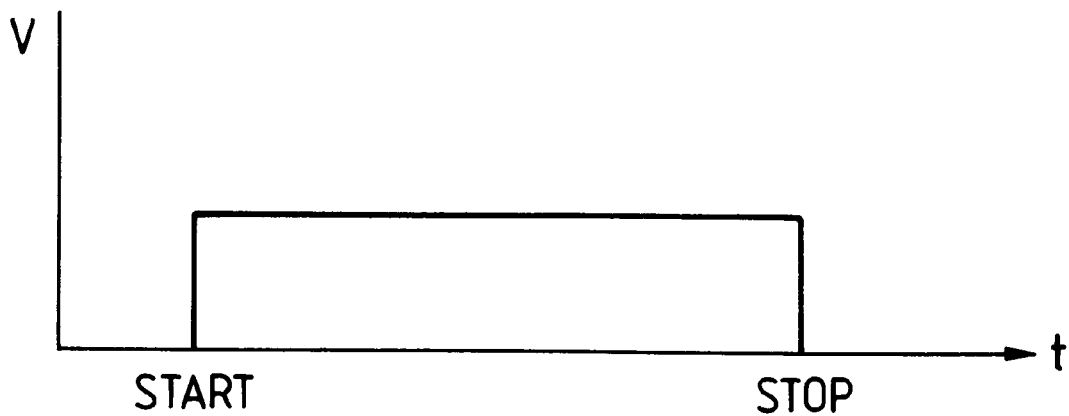
FIG. 34 is a chart for exemplifying an energizing mode of a film feeding motor in the example of the present invention, as shown in FIG. 29.
Figure 35:
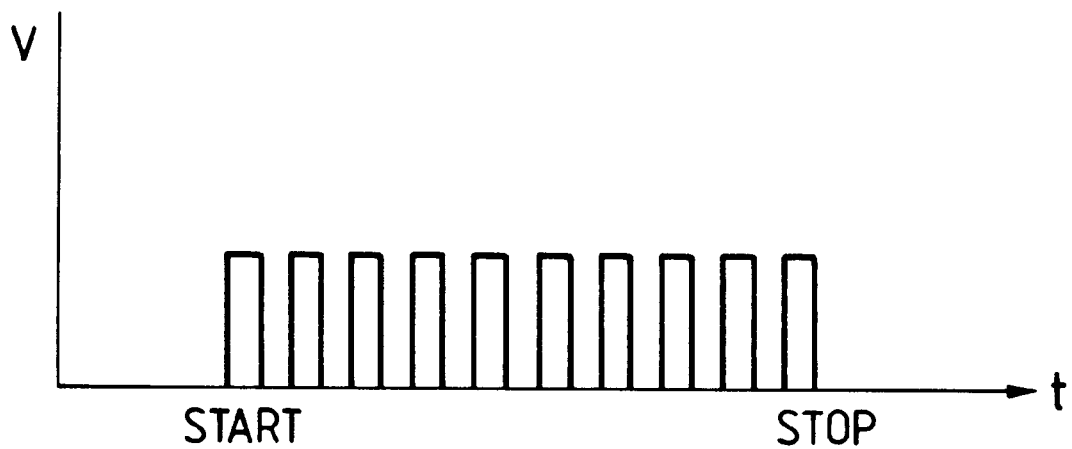
FIG. 35 is a chart for exemplifying another energizing mode of the film feeding motor in the example of the present invention, as shown in FIG. 29.

Here, the control circuit 101 drives the film feeding motor 2 via the film feeding motor driver circuit 103 in either of two modes of a "full energize mode" in which the film feeding motor 2 is always energized as shown in FIG. 34, and a "pulse energize mode" in which the film feeding mode is energized with the pulse signal repeatedly issued within a minute time as shown in FIG. 35, in which the output of the film feeding motor 2 in the "full energize mode" is greater than that in the "pulse energize mode", with the film feeding speed being naturally faster.

Note that an "energize mode" useful for changing the output value of the film feeding motor 2 may utilize a method of changing the ratio of energizing time, or the duty, in the "pulse energize mode".

Next, the operation of the control circuit 101 will be described in accordance with the flowchart of FIG. 36.

The operation following step 100 is started if a power switch of the camera is turned on.

[Step 100] A determination is made as to whether or not both the cartridge loading switch 106 and the back cover switch 107 are turned on. Since the film cartridge C is loaded into the camera if both are turned on, the operation goes to step 101.

[Step 101] A determination is made as to whether or not the film type determination switch 6 as shown in FIG. 29 is turned on. If it is turned on, the film F is judged to be a negative because the film cartridge C is not provided with the cut-out portion 5, and the operation goes to step 102. If the film type determination switch 6' is not turned on, the film is judged to be a reversal because the film cartridge C is provided with the cut-out portion 5, and the operation goes to step 103.

[Step 102] The film feeding motor 2 is set to be driven at the "pulse energize mode" via the film feeding motor driver circuit 103. In this case, the film feeding speed is slower.

[Step 103] The film feeding motor 2 is set to be driven at the "full energize mode" via the film feeding motor driver circuit 103. In this case, the film feeding speed is faster than in the negative film.

[Step 104] The film feeding motor driver circuit 103 is driven, the operation of setting the first frame of the film F at an aperture position with the film feeding motor 2, or the so-called film idle feeding operation, is started. At this time, the film feeding motor 2 is driven in the energize mode which has been set at step 102 or 103 in accordance with the type of the film F.

[Step 105] The magnetic head H is driven via the magnetic head driving circuit 104 during the film idle feeding operation so as to read and store the film information such as the film speed, the number of film frames, and the film type (negative or reversal) prewritten on the magnetic track T of the film F.

The film feeding motor 2 is driven in the "pulse energize mode", with a slower film feeding speed, if the film F is a negative or a film having a larger magnetic layer density, as previously described, while it is driven in the "full energize mode", with a faster film feeding speed, if the film F is a reversal or a film having a small magnetic layer density. Accordingly, the level of the reproducing signal input from the magnetic head H into the signal amplifier 108a within the magnetic reproduction circuit 108 is equivalent, whether the negative film or the reversal film is used. For this purpose, it is only necessary that the amplification factor of the signal amplifier 108a is constant, and there is no necessity of changing the amplification factor with a complex circuit. The analog signal amplified by the signal amplifier 108a has no difference from an original signal output from the magnetic head H, this signal being converted into a digital signal by the A/D converter 108b constituted of a well-known circuit, which is then picked up by the control circuit 101.

[Step 106] If the completion of the setting of the first frame is determined via well-known means (e.g., via the detection of the film feed amount with an encoder, or the detection of the motor energizing time or the perforations P), the operation goes to step 107.

[Step 107] The film feeding motor 2 is stopped via the film feeding motor driver 103, and thus the winding of the film is stopped.

[Step 108] The state of the release switch 105 is determined. If it is on, the operation goes to step 106 because the release has been made.

[Step 109] The photographing operation such as the focusing of the taking lens or the exposure operation with the opening or closing of the shutter is performed by driving the AF/AE control circuit 102.

[Step 110] A comparison is made between the predefined film frame number read at the step 105 or the number of film frames preset by well-known means and the number of already used frames, so as to determine whether or not there is any remaining film frame. And the operation goes to step 111 if there is any remaining frame, or to step 115 if there is no remaining frame.

[Step 111] The winding of the film by one frame to the next frame is started by driving the film feeding motor 2 via the film feeding motor driver circuit 103.

In this case, the film feeding motor 2 is driven in the energize mode which has been determined at step 102 or 103.

[Step 112] In winding the film F to the next frame, the magnetic head H is driven via the magnetic head driving circuit 104 to write the photographing information, such as the shutter speed, the aperture, or the data of photographing, onto the magnetic track T corresponding to a photographing frame of the film F, or the magnetic reproducing circuit 108 is driven to read the information written on the film F with the magnetic head H.

[Step 113] A determination is made as to whether or not the winding of the film F to the next frame has been completed. The operation goes to step 114 if it is completed, or returns to step 111 if it is not completed.

[Step 114] The winding of the film F is stopped by stopping the driving of the film feeding motor 2 via the film feeding motor driver circuit 103. Then the operation returns to step 108.

If it is determined that there is no remaining film frame at the step 110, the operation goes to step S115 as previously described.

[Step 115] The film feeding motor 2 is driven in a rewinding direction via the film feeding motor driver circuit 103, to start rewinding the film F within the film cartridge C.

In this case, since the writing or reading of the information with the magnetic head H is not performed, the driving mode of the film feeding motor 2 may be either of the "full energize mode" and the "pulse energize mode".

[Step 116] A determination is made as to whether or not the rewinding of the film F within the cartridge C has been completed. The operation goes to step S117 if it is completed, or to step 115 if not.

[Step 117] A series of operations for the camera are terminated.

Figure 37:
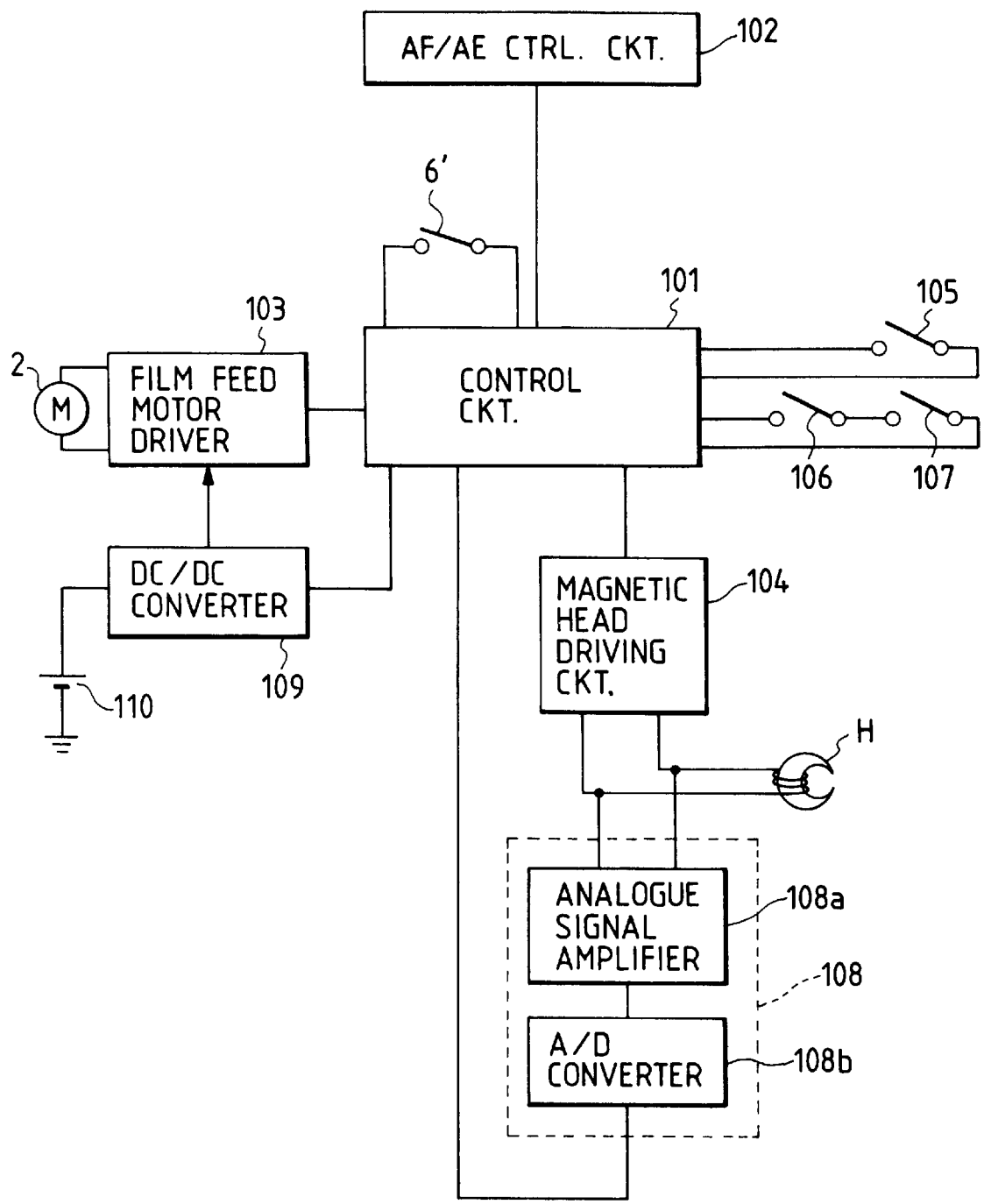
FIG. 37 is a circuit block diagram of a camera in another example of the present invention.

FIG. 37 is a circuit block diagram of the camera in another example of the present invention, in which the same symbols are attached to the same parts as in the example of FIG. 33.

In this example, there are provided two kinds of voltages "E1, E2 (E1<E2)" for driving the film feeding motor 2 such that the film feeding motor 2 is driven at a voltage "E1" if the film type determination switch 6' is ON or the film F is a negative, or the film feeding motor 2 is driven at a voltage "E2" if the film type determination switch 6' is not ON or the film F is a reversal, so that the feeding speed of the film F can be changed.

In FIG. 37, 109 is a DC/DC converter for generating the two kinds of voltages "E1" and "E2" (E1<E2) when the voltage of a power 110 is E, to supply the voltage of "E1" or "E2" to the film feeding motor driver circuit 103, in accordance with a control signal from the control circuit 101, and to drive the film feeding motor 2.

The control circuit 101 instructs the DC/DC converter 109 to supply the voltage of "E2" to the film feeding motor driver 103 if the film F is a reversal, or the voltage of "E1" if the film F is a negative, in reading the information from the magnetic track T with the magnetic head H. Hence, as a result, the signal level when the output of the magnetic head H is input into the signal amplifier 108a is of the same magnitude.

Figure 38:
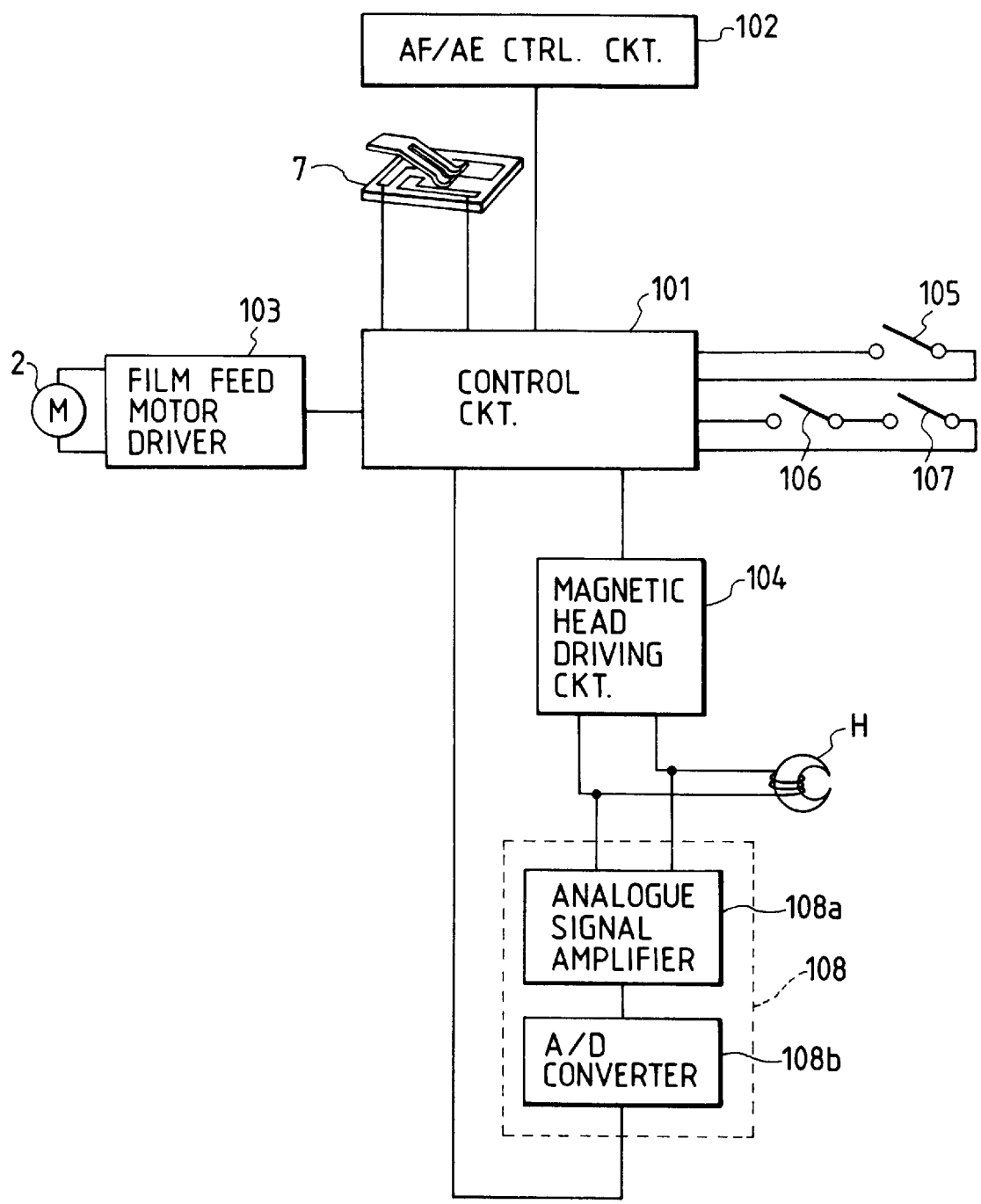
FIG. 38 is a circuit block diagram of a camera in another example of the present invention.

FIG. 38 is a circuit block diagram for showing another example of the present invention, in which the same symbols are attached to the same parts as in the example of FIGS. 33 and 37.

In this example, it is supposed that the input of a film type identification is manually performed by the user. In FIG. 38, 7 is a film type setting switch comprised of a well-known contact piece and a pattern substrate. And when the user performs the operation to indicate that the film F is a negative, the film type setting switch 7 is turned on, or when the user performs the operation to indicate that the film F is a reversal, the film type setting switch 7 is turned off.

Figure 39:
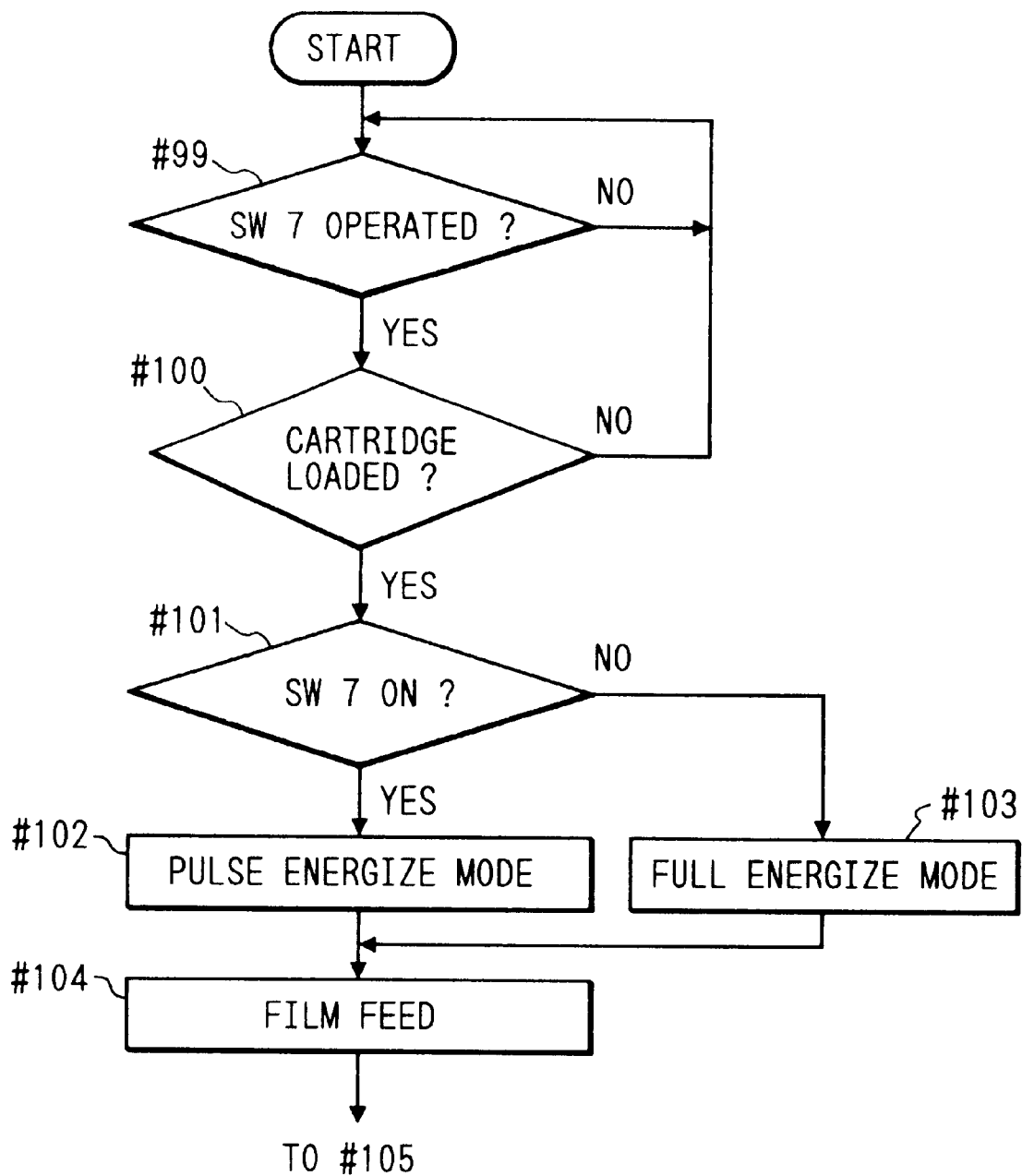
FIG. 39 is a flowchart showing a main portion of the operation of the control circuit of FIG. 38.

Next, the operation of the control circuit 101 with this constitution will be described in conjunction with a flow-chart of FIG. 39. Note that FIG. 39 shows a portion different from FIG. 36.

If the power of the camera is turned on, the operation following the step 99 is started.

[Step 99] A determination is made as to whether or not the film type setting switch 7 is operated by the user, and the operation goes to step 99 upon the determination.

[Step 100] A determination is made as to whether or not both the film cartridge loading switch 106 and the back cover switch 107 are turned on, and the operation goes to step 101 upon the determination that both are turned on, because the film cartridge 1 has been loaded into the camera.

[Step 101] A determination is made as to whether or not the film type setting switch 7 as shown in FIG. 38 is turned on. If the film type setting switch 7 is turned on, the operation goes to step 102, because the loaded film F is a negative. If it is turned off, the operation goes to step 103, because the loaded film F is a reversal.

[Step 102] The film feeding motor 2 is set to be driven via the film feeding motor driver circuit 103 in the "pulse energize mode". In this case, the film feeding speed is slower.

[Step 103] The film feeding motor 2 is set to be driven via the film feeding motor driver circuit 103 in the "full energize mode". In this case, the film feeding speed is faster than in the negative film.

[Step 104] The film feeding motor driver circuit 103 is driven, the operation of setting the first frame of the film F at an aperture position with the film feeding motor 2, or the so-called film idle feeding operation, is started. At this time, the film feeding motor 2 is driven in the energize mode which has been set at step 102 or 103 in accordance with the type of the film F.

Figure 36:
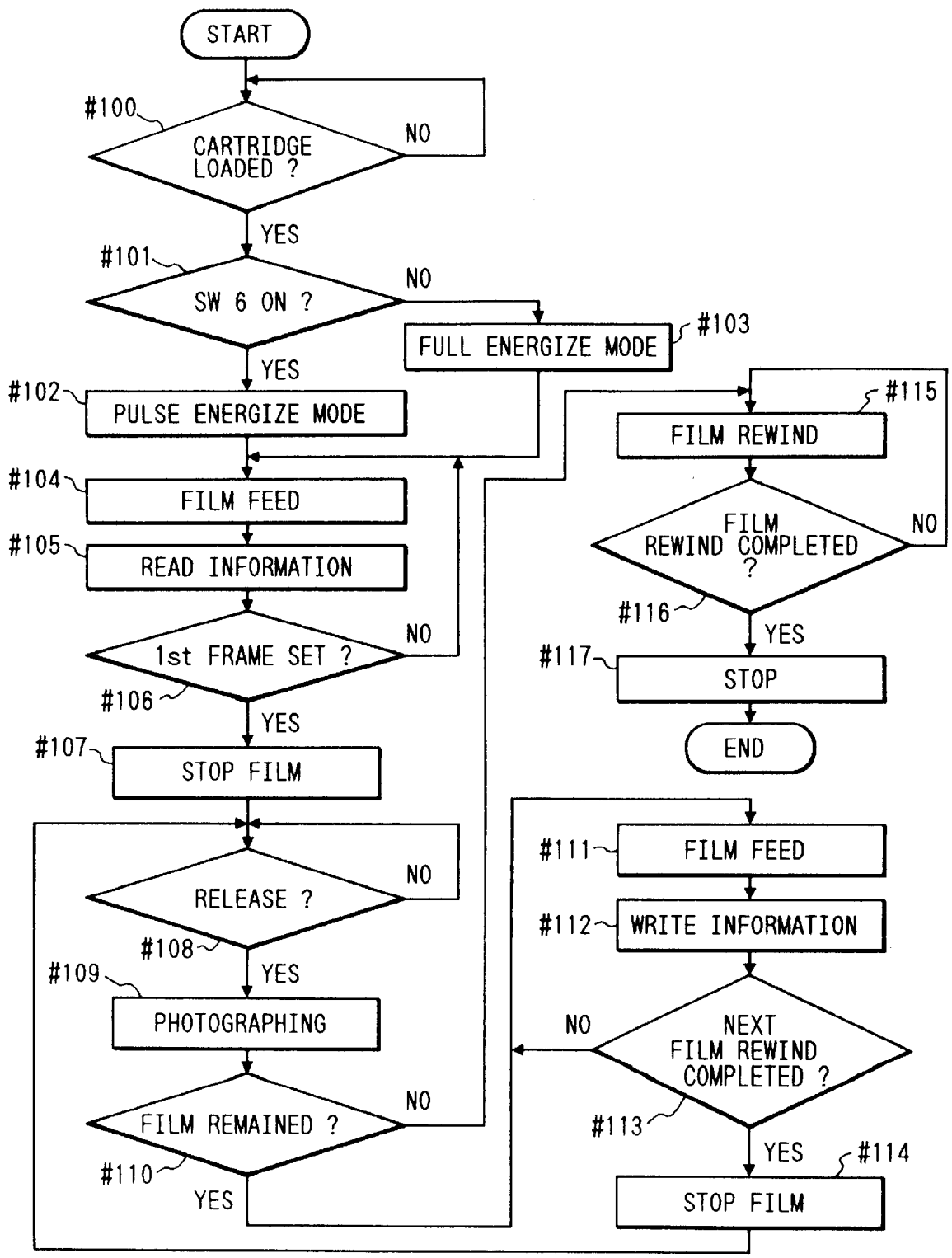
FIG. 36 is a flowchart showing the operation of a control circuit of FIG. 33.

Thereafter, the same operation as that following step 105 in FIG. 36 is performed.

What is claimed is:

1. A camera comprising:

a magnetic head portion for reading information from a recording portion of a loaded film;

a detection circuit for detecting whether the loaded film type is negative type film or reversal type film;

a first amplifying circuit for amplifying a signal output from said magnetic head portions;

a gain setting circuit for changing over and setting a gain of said first amplifying circuit in accordance with a detection signal from said detection circuit representative of whether the loaded film type is negative type film or reversal type film, said gain setting circuit setting a gain corresponding to the negative type film to be smaller than a gain corresponding to the reversal type film; and a second amplifying circuit connected to said first amplifying circuit, wherein a predetermined offset amount in accordance with an output of said second amplifying circuit offsets an output of said first amplifying circuit.

2. A camera according to claim 1, wherein said detection circuit detects the loaded film type by detecting information from an information portion provided with a cartridge of the loaded film.

3. A camera according to claim 1, further comprising a filter circuit for passing through a signal in a predetermined frequency range from the signal output from said first amplifying circuit.

4. A camera for use with a film having a magnetic track for storing information, said camera comprising:

detection means for detecting whether the loaded film type is negative or reversal;

a magnetic head for reading information from the magnetic track of the film and for outputting a read signal representative of the information;

a first amplifying circuit for amplifying the read signal output by said magnetic head;

a gain setting circuit for setting an amplification gain for said first amplifying circuit (i) to a first predetermined gain in accordance with a detection signal from said detection means representative of a reversal type of detected film, and (ii) to a second predetermined gain in accordance with a detection signal from said detection means representative of a negative type of detected film, the first predetermined gain being greater than the second predetermined gain; and a second amplifying circuit being connected to said first amplifying circuit, wherein a predetermined offset amount in accordance with an output of said second amplifying circuit offsets the output of said first amplifying circuit.

5. A camera according to claim 4, further comprising a filter circuit for passing through a signal in a predetermined frequency range from the signal output by said first amplifying circuit.

* * * * *

UNITED STATES PATENT AND TRADEMARK OFFICE
CERTIFICATE OF CORRECTION

PATENT NO. : 6,064,828

DATED : May 16, 2000

INVENTOR(S): TOSHIHARU UEDA, ET AL.                    Page 1 of 3

It is certified that error appears in the above-identified patent and that said Letters Patent is hereby corrected as shown below:

ON THE TITLE PAGE

[*] Notice:
"[*] Notice:   This patent issued on a continued prosecution application filed under 37 CFR 1.53(d), and is subject to the twenty year patent term provisions of 35 U.S.C. 154(a)(2)."
should be deleted.

ABSTRACT [57]
  Line 1, "curcuitry" should read --circuitry--.

COLUMN 1
  Line 30, "in" should be deleted.
  Line 48, "a" should be deleted.
  Line 57, "a" should be deleted.
  Line 64, "a" should be deleted.

UNITED STATES PATENT AND TRADEMARK OFFICE
CERTIFICATE OF CORRECTION

PATENT NO. : 6,064,828

DATED : May 16, 2000

INVENTOR(S): TOSHIHARU UEDA, ET AL.

It is certified that error appears in the above-identified patent and that said Letters Patent is hereby corrected as shown below:

COLUMN 2
    Line 44, "in" should read --shows--.
    Line 48, "is" should read --shows--.

COLUMN 4
    Line 66, "the" (second occurrence) should be deleted.

COLUMN 6
    Line 2, "(#30):" should read --(#30).--.

COLUMN 8
    Line 67, "is" should be deleted.

COLUMN 9
    Line 24, "an" should be deleted.
    Line 57, "R89)}]." should read --R89)}]--.

COLUMN 13
    Line 5, "film" should read --film,-- and, "film," should read --film--.

UNITED STATES PATENT AND TRADEMARK OFFICE
CERTIFICATE OF CORRECTION

PATENT NO. : 6,064,828

DATED : May 16, 2000

INVENTOR(S): TOSHIHARU UEDA, ET AL.

It is certified that error appears in the above-identified patent and that said Letters Patent is hereby corrected as shown below:

COLUMN 18
    Line 4, "and should read --or--.

Signed and Sealed this

Eighth Day of May, 2001

Attest:

NICHOLAS P. GODICI

Attesting Officer        Acting Director of the United States Patent and Trademark Office